(12) United States Patent
Chen et al.

(10) Patent No.: US 11,287,850 B2
(45) Date of Patent: Mar. 29, 2022

(54) FOLDABLE DISPLAY DEVICE

(71) Applicant: Au Optronics Corporation, Hsinchu (TW)

(72) Inventors: Kuan-Yu Chen, Hsinchu (TW); Chun-Hsin Liu, Hsinchu (TW)

(73) Assignee: Au Optronics Corporation, Hsinchu (TW)

( * ) Notice: Subject to any disclaimer, the term of this patent is extended or adjusted under 35 U.S.C. 154(b) by 0 days.

(21) Appl. No.: 16/941,553

(22) Filed: Jul. 29, 2020

(65) Prior Publication Data

US 2021/0223823 A1 Jul. 22, 2021

(30) Foreign Application Priority Data

Jan. 17, 2020 (TW) ................................. 109101747

(51) Int. Cl.
*G06F 1/16* (2006.01)
(52) U.S. Cl.
CPC .................................. *G06F 1/1641* (2013.01)
(58) Field of Classification Search
CPC ....... G06F 1/1641; G06F 1/1652; G09F 9/301
See application file for complete search history.

(56) References Cited

U.S. PATENT DOCUMENTS

| 9,823,770 | B2 * | 11/2017 | Lee | ........................ G06F 3/0416 |
| 10,403,692 | B2 * | 9/2019 | Park | .................... H01L 27/3276 |
| 10,916,601 | B2 | 2/2021 | Park | |
| 2017/0038794 | A1 | 2/2017 | Song et al. | |
| 2018/0182985 | A1 * | 6/2018 | Kang | ................... H01L 51/5237 |
| 2019/0223294 | A1 * | 7/2019 | Kwon | ..................... H05K 1/189 |
| 2020/0103942 | A1 | 4/2020 | Su et al. | |
| 2020/0135832 | A1 * | 4/2020 | Ma | ........................ G09G 3/3225 |

FOREIGN PATENT DOCUMENTS

| CN | 104867406 | 8/2015 |
| CN | 108630823 | 10/2018 |
| CN | 109243306 | 1/2019 |

* cited by examiner

*Primary Examiner* — Rockshana D Chowdhury
(74) *Attorney, Agent, or Firm* — JCIPRNET

(57) ABSTRACT

A foldable display device, including a display panel, a pad portion, and a driving element, is provided. The display panel has a display region and a peripheral region connected to at least one side of the display region. The pad portion is disposed in the peripheral region. The driving element is electrically connected to the pad portion. A first display region folding line, extending along a first direction, is provided in the display region to divide the display region into a first sub-display region and a second sub-display region. A first peripheral region folding line and a second peripheral region folding line, extending along a second direction, are parallelly disposed in the peripheral region. A first notch is disposed at a position in the peripheral region. Along the first direction, the first notch has a first folding interval. Along the second direction, the first notch has a second folding interval.

20 Claims, 21 Drawing Sheets

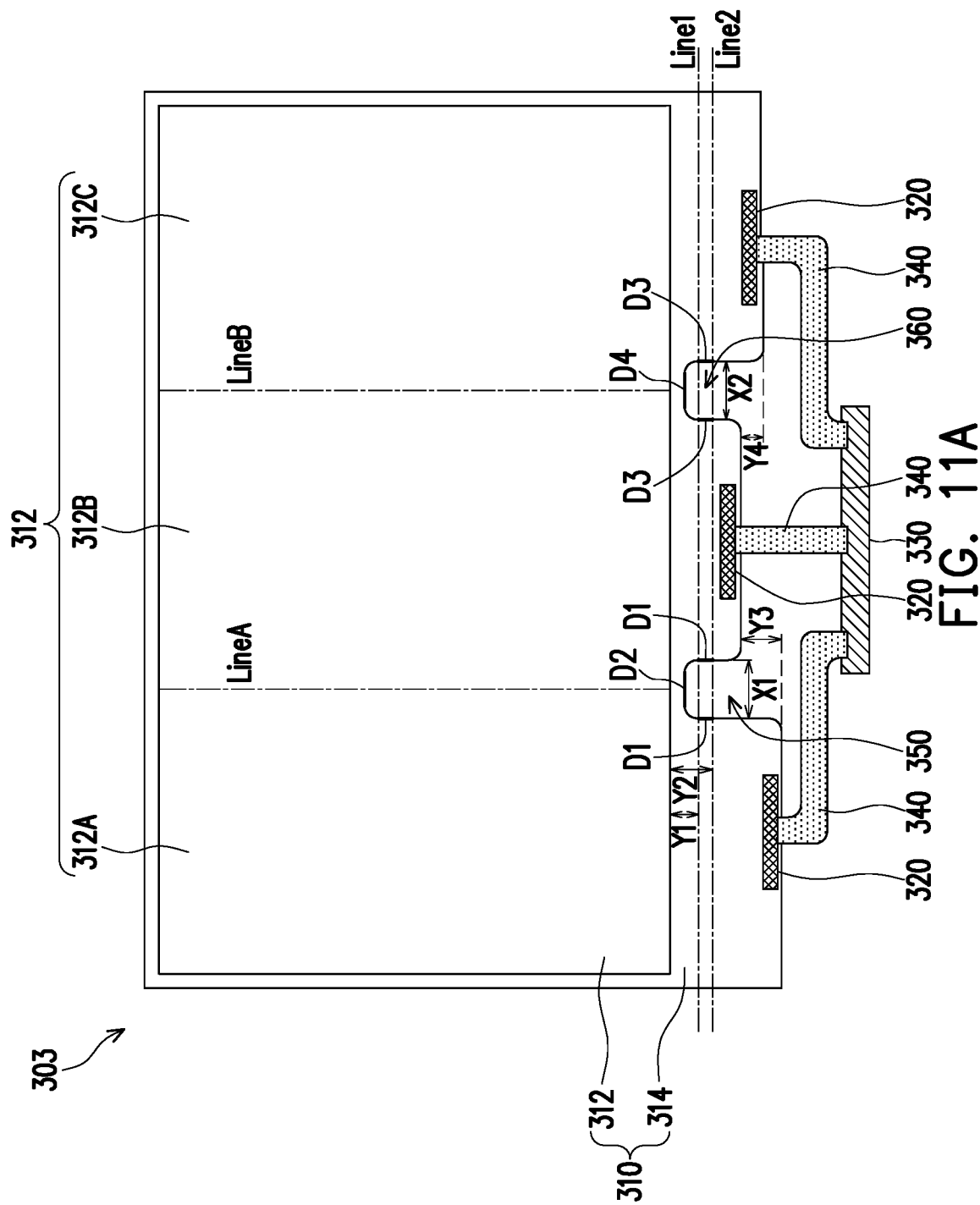

FOLDABLE DISPLAY DEVICE

CROSS-REFERENCE TO RELATED APPLICATION

This application claims the priority benefit of Taiwan application serial no. 109101747, filed on Jan. 17, 2020. The entirety of the above-mentioned patent application is hereby incorporated by reference herein and made a part of this specification.

BACKGROUND OF THE INVENTION

1. Field of the Invention

The invention relates to a display device, and in particular, to a foldable display device.

2. Description of Related Art

In recent years, displays become important devices in electronic products. Despite a trend of miniaturization of electronic products, many consumers still need large-screen displays. Therefore, a flexible display with a foldable display panel is developed to meet users' needs.

FIG. 1 is a schematic diagram of a conventional foldable display device. Referring to FIG. 1, a foldable display device 100 includes: a display panel 110, a pad portion 120, a driving element 130, and a connection line 140. The display panel 110 has a display region 112 and a peripheral region 114. The peripheral region 114 is connected to at least one side of the display region 112. The pad portion 120 is disposed in the peripheral region 114. The driving element 130 is electrically connected to the pad portion 120 via the connection line 140. Referring to FIG. 1, the peripheral region 114 may be folded by using a folding line 1. However, the foldable display device 100 in FIG. 1 can perform a folding operation in only a single direction, and a folding manner is limited.

FIG. 2 is a schematic diagram of another conventional foldable display device. Referring to FIG. 2, a foldable display device 200 includes: a display panel 210, a pad portion 220, a driving element 230, and a connection line 240. The display panel 210 has a display region 212 and a peripheral region 214. The peripheral region 214 is connected to at least one side of the display region 212. The pad portion 220 is disposed in the peripheral region 214. The driving element 230 is electrically connected to the pad portion 220 via the connection line 240. Referring to FIG. 2, the peripheral region 214 may be folded by using the folding line 1, and the display panel 210 is folded by using a folding line A to reduce a carrying volume of the foldable display device 200. However, the foldable display device 200 in FIG. 2 can be folded in only a single direction by using existing materials, and the folding line 1 needs to be parallel to the folding line A. Therefore, a folding direction of the display panel 210 is limited. In addition, during folding of the display panel 210 along the folding line A, stress is likely to accumulate on an edge of the display panel 210, causing the display panel 210 to be damaged from the edge.

SUMMARY OF THE INVENTION

The invention provides a foldable display device, which can increase possibilities of various folding manners of a display panel, and can avoid damage to the display panel caused by stress generated during folding.

The invention proposes a foldable display device, including: a display panel, a pad portion, and a driving element. The display panel has a display region and a peripheral region. The peripheral region is connected to at least one side of the display region. The pad portion is disposed in the peripheral region. The driving element is electrically connected to the pad portion. A first display region folding line is provided in the display region. The first display region folding extends along a first direction of the display panel to divide the display region into a first sub-display region and a second sub-display region. A first peripheral region folding line and a second peripheral region folding line are provided in the peripheral region parallel to each other. The first peripheral region folding line and the second peripheral region folding line extend along a second direction that intersects the first direction. A first notch is provided at a position in the peripheral region at which an extending direction of the first display region folding line and an extending direction of the first peripheral region folding line and the second peripheral region folding line intersect. Along the first direction, the first notch has a first folding interval between the first peripheral region folding line and the second peripheral region folding line. Along the second direction, the first notch has a second folding interval.

In an embodiment of the invention, the first folding interval and the second folding interval each are a line segment.

In an embodiment of the invention, a distance between the pad portion arranged in the peripheral region provided on one side of the first sub-display region and the display region is different from a distance between the pad portion arranged in the peripheral region provided on one side of the second sub-display region and the display region.

In an embodiment of the invention, in the second direction, a length of the driving element is less than a length of the first sub-display region. In the second direction, the length of the driving element is less than a length of the second sub-display region.

In an embodiment of the invention, in the second direction, the first notch has a first width greater than the second folding interval.

In an embodiment of the invention, a first distance exists between the first peripheral region folding line and the display region. A second distance exists between the second peripheral region folding line and the display region.

In an embodiment of the invention, the peripheral region provided on one side of the first sub-display region has a first edge. The peripheral region provided on one side of the second sub-display region has a second edge. A third distance exists between the first edge and the second edge.

In an embodiment of the invention, the peripheral region provided on one side of the first sub-display region has a first edge. The peripheral region provided on one side of the second sub-display region has a second edge. A distance between the first edge and the display region is different from a distance between the second edge and the display region.

In an embodiment of the invention, the first notch is a communication hole, and the first notch is communicated from an edge of the peripheral region toward an inner side of the peripheral region.

In an embodiment of the invention, in the second direction, in the extending direction of the first peripheral region folding line and the second peripheral region folding line, the first notch has a first width. In the second direction, not in the extending direction of the first peripheral region folding line and the second peripheral region folding line, the first notch has a second width. The second width is less than the first width.

In an embodiment of the invention, the first notch is a closed hole, and a specific distance exists between the first notch and an edge of the peripheral region.

In an embodiment of the invention, if a width of the display panel after folding is set to W, and a folding angle of the first folding interval is set to θ, a length of the first folding interval satisfies a formula (1):

$$W \times \tan(\theta/\pi) \leq D1 \quad (1), \text{ where}$$

θ=0.1°.

In an embodiment of the invention, if a height of the display panel after folding is set to H, and a folding angle of the second folding interval is set to θ, a length of the second folding interval satisfies a formula (2):

$$H \times \tan(\theta/\pi) \leq D2 \quad (2), \text{ where}$$

θ=0.1°.

The invention further proposes a foldable display device, including: a display panel, a pad portion, and a driving element. The display panel has a display region and a peripheral region. The peripheral region is connected to at least one side of the display region. The pad portion is disposed in the peripheral region. The driving element is electrically connected to the pad portion. A first display region folding line and a second display region folding line are provided in the display region. The first display region folding line and the second display region folding line extend along a first direction of the display panel to divide the display region into a first sub-display region, a second sub-display region, and a third sub-display region. A first peripheral region folding line and a second peripheral region folding line are provided in the peripheral region parallel to each other. The first peripheral region folding line and the second peripheral region folding line extend along a second direction that intersects the first direction. A first notch is provided at a position in the peripheral region at which an extending direction of the first display region folding line and an extending direction of the first peripheral region folding line and the second peripheral region folding line intersect. Along the first direction, the first notch has a first folding interval between the first peripheral region folding line and the second peripheral region folding. Along the second direction, the first notch has a second folding interval. A second notch is provided at a position in the peripheral region at which an extending direction of the second display region folding line and the extending direction of the first peripheral region folding line and the second peripheral region folding line intersect. Along the first direction, the second notch has a third folding interval between the first peripheral region folding line and the second peripheral region folding. Along the second direction, the second notch has a fourth folding interval.

In an embodiment of the invention, the first folding interval, the second folding interval, the third folding interval, and the fourth folding interval each are a line segment.

In an embodiment of the invention, a distance between the pad portion arranged in the peripheral region provided on one side of the first sub-display region and the display region, a distance between the pad portion arranged in the peripheral region provided on one side of the second sub-display region and the display region, and a distance between the pad portion arranged in the peripheral region provided on one side of the third sub-display region and the display region are different from each other.

In an embodiment of the invention, in the second direction, a length of the driving element is less than a length of the first sub-display region. In the second direction, the length of the driving element is less than a length of the second sub-display region. In the second direction, the length of the driving element is less than a length of the third sub-display region.

In an embodiment of the invention, in the second direction, the first notch has a first width greater than the second folding interval. In the second direction, the second notch has a second width greater than the fourth folding interval.

In an embodiment of the invention, a first distance exists between the first peripheral region folding line and the display region. A second distance exists between the second peripheral region folding line and the display region.

In an embodiment of the invention, the peripheral region provided on one side of the first sub-display region has a first edge, the peripheral region provided on one side of the second sub-display region has a second edge, and the peripheral region provided on one side of the third sub-display region has a third edge. A third distance exists between the first edge and the second edge, and a second distance exists between the second edge and the third edge.

In an embodiment of the invention, the peripheral region provided on one side of the first sub-display region has a first edge, the peripheral region provided on one side of the second sub-display region has a second edge, and the peripheral region provided on one side of the third sub-display region has a third edge. A distance between the first edge and the display region, a distance between the second edge and the display region, and a distance between the third edge and the display region are different from each other.

In an embodiment of the invention, the first notch and the second notch are communication holes, and the first notch and the second notch each are communicated from an edge of the peripheral region toward an inner side of the peripheral region.

In an embodiment of the invention, in the second direction, in the extending direction of the first peripheral region folding line and the second peripheral region folding line, the first notch has a first width and the second notch has a second width. In the second direction, not in the extending direction of the first peripheral region folding line and the second peripheral region folding line, the first notch has a third width and the second notch has a fourth width. The third width is less than the first width, and the fourth width is less than the second width.

In an embodiment of the invention, the first notch and the second notch are closed holes, and a specific distance exists between the first notch and an edge of the peripheral region and between the second notch and the edge of the peripheral region.

In an embodiment of the invention, the peripheral region provided on one side of the first sub-display region has a first edge, the peripheral region provided on one side of the second sub-display region has a second edge, and the peripheral region provided on one side of the third sub-display region has a third edge. The first edge, the second edge, and the third edge are aligned with each other. The pad portion arranged in the peripheral region provided on one side of the first sub-display region, the pad portion arranged in the peripheral region provided on one side of the second sub-display region, and the pad portion arranged in the peripheral region provided on one side of the third sub-display region are not aligned with each other.

Based on the above, in the foldable display device in the embodiments of the invention, the first notch is provided at the position in the peripheral region at which the extending direction of the first display region folding line and the extending direction of the first peripheral region folding line and the second peripheral region folding line intersect. Along the first direction, the first notch has the first folding interval between the first peripheral region folding line and the second peripheral region folding line. Along the second direction, the first notch has the second folding interval. During folding of the display region and the peripheral region of the foldable display device in the embodiments of the invention, folding actions in two directions can be performed by using the first notch, and stress generated by the folding action can be reduced. Therefore, in the invention, possibilities of various folding manners of a display panel can be increased, and damage to the display panel caused by stress generated during folding can be avoided.

To make the features and advantages of the invention clear and easy to understand, the following gives a detailed description of embodiments with reference to accompanying drawings.

BRIEF DESCRIPTION OF THE DRAWINGS

FIG. 11A to FIG. 11C are schematic diagrams of a folding process of the foldable display device according to the fourth embodiment of the invention.

DESCRIPTION OF THE EMBODIMENTS

Figure 1:
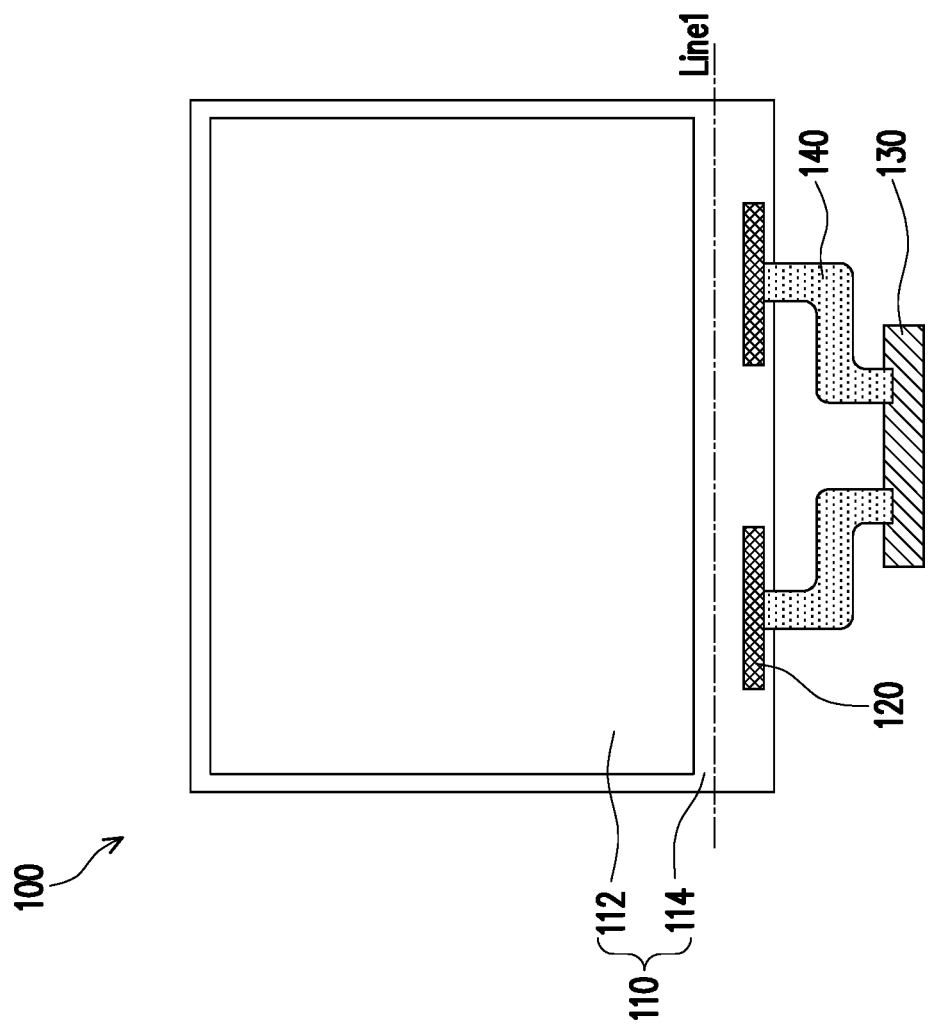
FIG. 1 is a schematic diagram of a conventional foldable display device.
Figure 2:
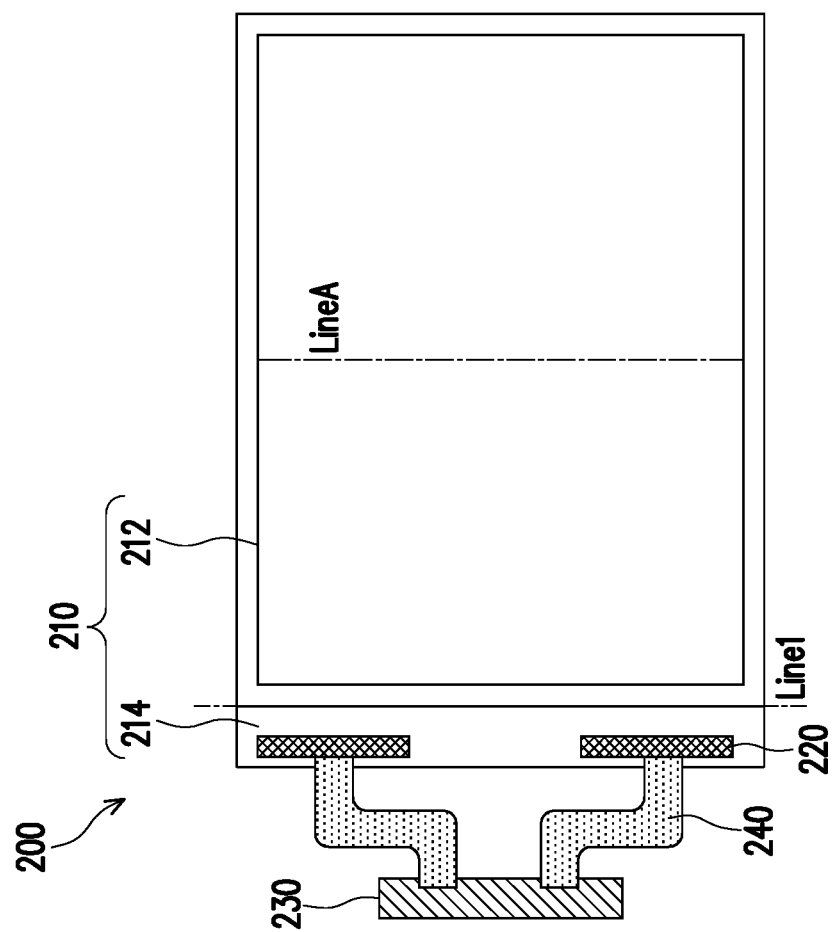
FIG. 2 is a schematic diagram of another conventional foldable display device.
Figure 3A:
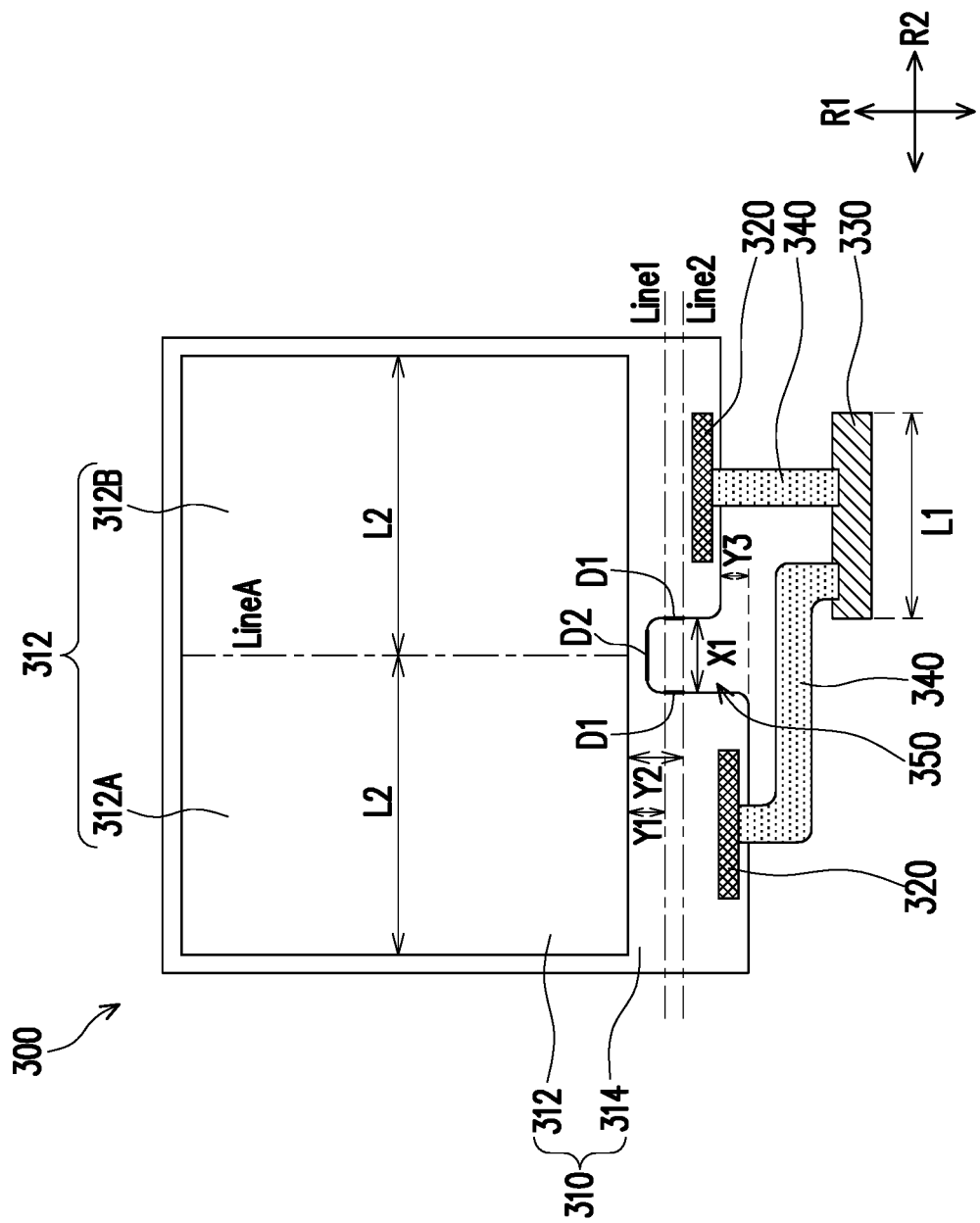
FIG. 3A is a schematic diagram of a foldable display device according to a first embodiment of the invention.
Figure 3B:
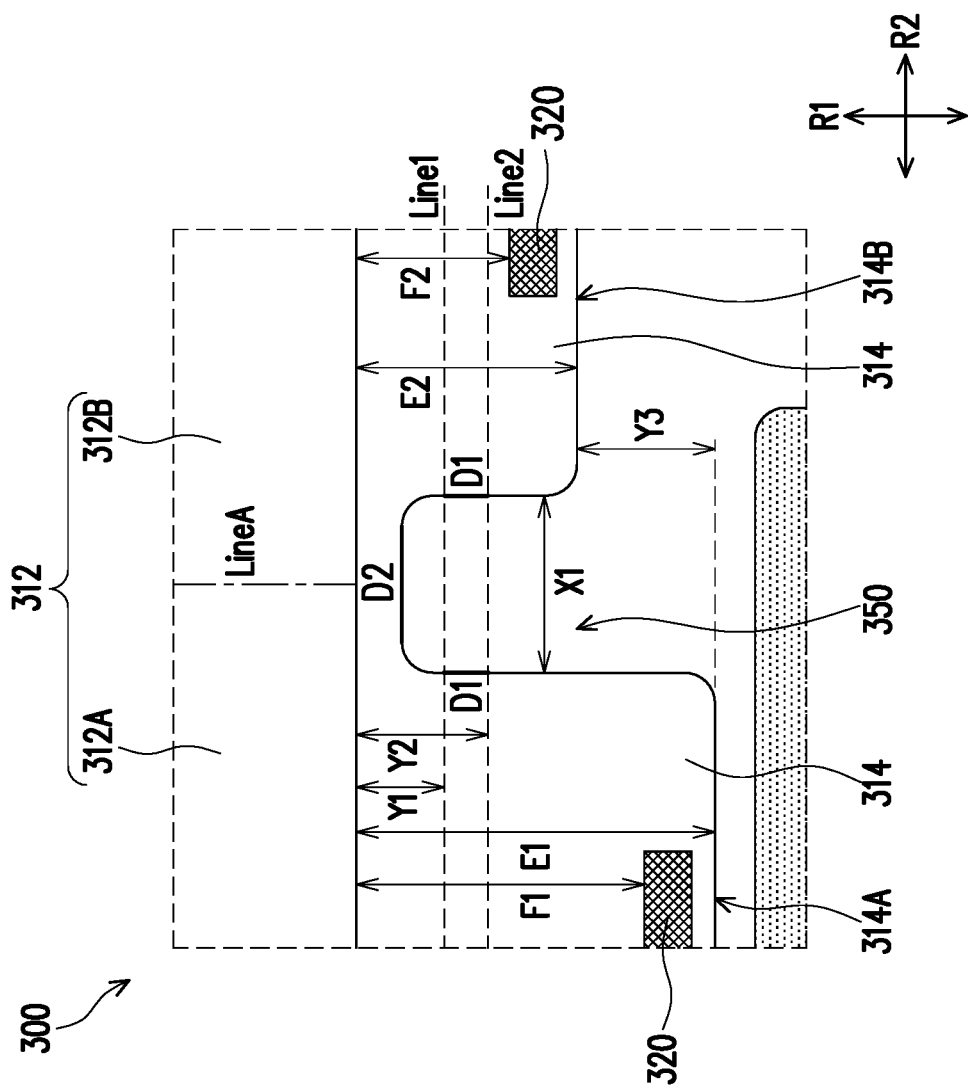
FIG. 3B is an enlarged schematic view of vicinity of a first notch in FIG. 3A.

FIG. 3A is a schematic diagram of a foldable display device according to a first embodiment of the invention. FIG. 3B is an enlarged schematic view of vicinity of a first notch in FIG. 3A. Referring to both FIG. 3A and FIG. 3B, a foldable display device 300 includes: a display panel 310, a pad portion 320, and a driving element 330. The display panel 310 has a display region 312 and a peripheral region 314. The peripheral region 314 is connected to at least one side of the display region 312. The pad portion 320 is disposed in the peripheral region 314. The driving element 330 is electrically connected to the pad portion 320.

The display panel 310 is, for example, an organic electro-luminescence display panel (organic light emitting display panel, OLED display panel), and has a foldable characteristic. The driving element 330 may be a printed circuit board, and is electrically connected to the pad portion 320 via a connection line 340. The driving element 330 may also be a chip on film (COF) structure. Alternatively, in other embodiments, the driving element 330 may also be a chip on board (COB) structure, that is, the driving element (chip) 330 is directly adhered to the pad portion 320. In the invention, implementations of the driving element 330 are not limited. In addition, the connection line 340 may adopt a flexible circuit board.

Referring to FIG. 3A, in the display region 312, a first display region folding line A is provided, the first display region folding line A extending along a first direction R1 of the display panel 312 to divide the display region 312 into a first sub-display region 312A and a second sub-display region 312B. A first peripheral region folding line 1 and a second peripheral region folding line 2 are provided in the peripheral region 314 parallel to each other. The first peripheral region folding line 1 and the second peripheral region folding line 2 extend along a second direction R2 that intersects the first direction R1.

It may be noted that, a first notch 350 is provided at a position in the peripheral region 314 at which an extending direction of the first display region folding line A and an extending direction of the first peripheral region folding line 1 and the second peripheral region folding line 2 intersect. Along the first direction R1, the first notch 350 has a first folding interval D1 between the first peripheral region folding line 1 and the second peripheral region folding line 2. Along the second direction R2, the first notch 350 has a second folding interval D2.

As shown in FIG. 3A, both the first folding interval D1 and the second folding interval D2 are line segments. The design of the line segment can provide a folding range for performing a folding action, and can better cushion stress generated by the folding action, to avoid damage to the display panel 310. In other words, in the embodiments of the invention, designing the first folding interval D1 and the second folding interval D2 (that is, places at which stress are likely to concentrate) as a line segment can prevent the display panel 310 from cracking during folding.

Accordingly, the peripheral region 314 can be folded along the first peripheral region folding line 1 and the second peripheral region folding line 2 by using the first folding interval D1 (for example, a line segment) of the first notch 350, and the display region 312 can be folded along the first display region folding line A by using the second folding interval D2 (for example, a line segment) of the first notch 350. In this way, stress generated by the folding action can be reduced to avoid damage to the display panel 310.

Referring to both FIG. 3A and FIG. 3B, a distance F1 between the pad portion 320 arranged in the peripheral region 314 provided on one side of the first sub-display region 312A and the display region 312 is different from a distance F2 between the pad portion 320 arranged in the peripheral region 314 provided on one side of the second sub-display region 312B and the display region 312. As shown in FIG. 3B, the distance F1 is greater than the distance F2. In such an arrangement, the two pad portions 320 can be at different positions in the peripheral region 314 in the first direction R1. Therefore, in the foldable display device 300 after folding, the two pad portions 320 do not overlap each other, so that the foldable display device 300 after folding can have a smaller thickness.

Still referring to FIG. 3A, in the second direction R2, a length L1 of the driving element 330 is less than a length L2 of the first sub-display region 312A. In the second direction R2, the length L1 of the driving element 330 is less than a length L2 of the second sub-display region 312B. Therefore, during folding of the display region 312 along the first display region folding line A, the driving element 330 does not overlap the first display region folding line A, so that folding of the foldable display device 300 can be smoother.

Referring to FIG. 3A, in the second direction R2, the first notch 350 has a first width X1 greater than the second folding interval D2. Therefore, during folding of the display region 312 along the first display region folding line A, the second folding interval D2 can reduce stress generated by the folding action, and the folding action can be controlled within a range of the first width X1 of the first notch 350.

Still referring to FIG. 3A, a first distance Y1 exists between the first peripheral region folding line 1 and the display region 312. A second distance Y2 exists between the second peripheral region folding line 2 and the display region 312. Therefore, the first folding interval D1 can be generated between the first peripheral region folding line 1 and the second peripheral region folding line 2. During folding of the peripheral region 314 along the first peripheral region folding line 1 and the second peripheral region folding line 2, the first folding region D1 can reduce stress generated by the folding action.

Referring to FIG. 3A and FIG. 3B, the peripheral region 314 provided on one side of the first sub-display region 312A has a first edge 314A. The peripheral region 314 provided on one side of the second sub-display region 312B has a second edge 314B. A third distance Y3 exists between the first edge 314A and the second edge 314B.

Still referring to FIG. 3A and FIG. 3B, the peripheral region 314 provided on one side of the first sub-display region 312A has a first edge 314A. The peripheral region 314 provided on one side of the second sub-display region 312B has a second edge 314B. A distance E1 between the first edge 314A and the display region 312 is different from a distance E2 between the second edge 314B and the display region 312. As shown in FIG. 3B, the distance E1 is greater than the distance E2.

As shown in FIG. 3B, one pad portion 320 is disposed near the first edge 314A, and another pad portion 320 is disposed near the second edge 314B. The distances E1, E2, F1, F2, and Y3 are set in the above manner so that the two pad portions 320 can be at different positions in the peripheral region 314 in the first direction R1. Furthermore, in the foldable display device 300 after folding, the two pad portions 320 do not overlap each other, so that the foldable display device 300 after folding can have a smaller thickness.

In addition, referring to FIG. 3A, the first notch 350 may be a communication hole, and the first notch 350 is communicated from an edge of the peripheral region 314 toward an inner side of the peripheral region 314. The folding action of the foldable display device 300 according to the first embodiment of the invention is further described below.

Figure 4A:
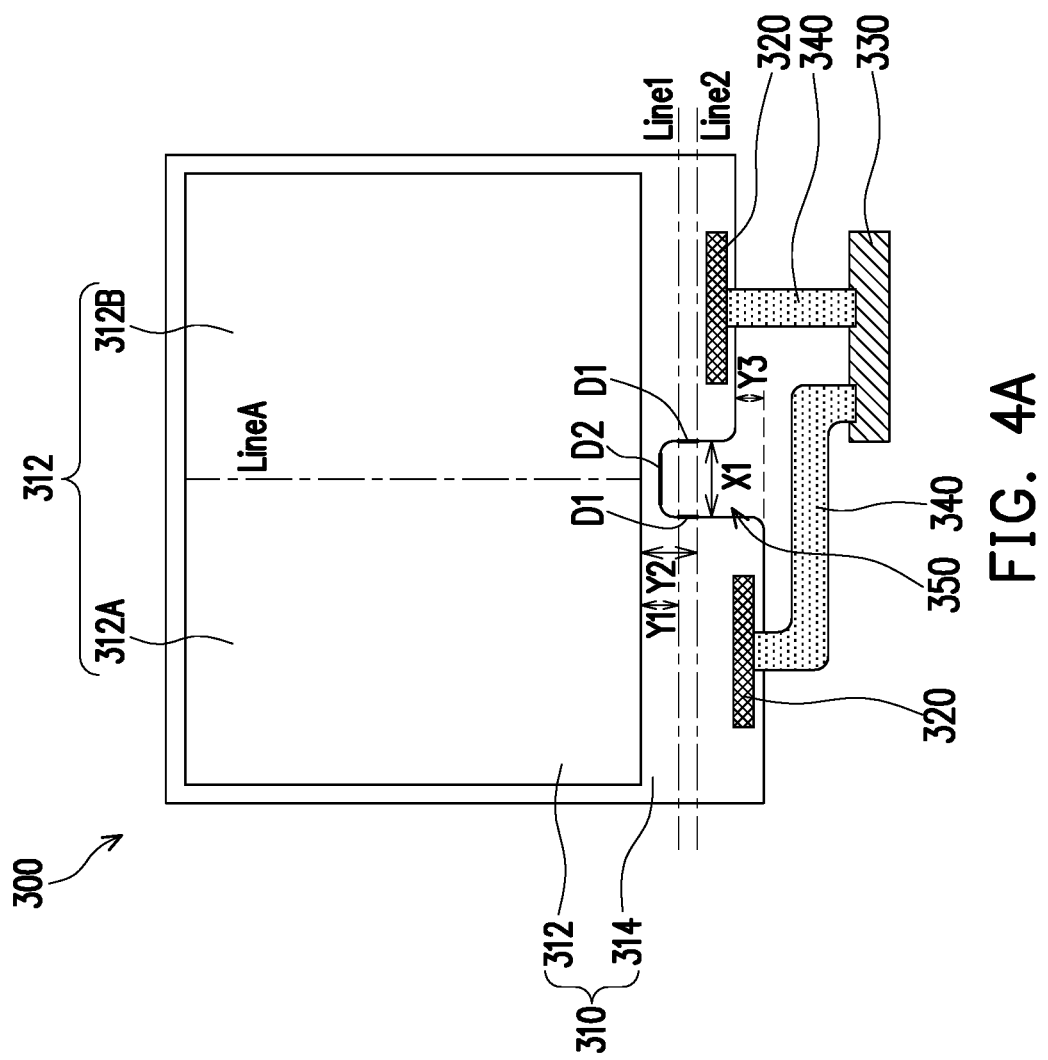
FIG. 4A to FIG. 4C are schematic diagrams of a folding process of the foldable display device according to the first embodiment of the invention.
Figure 4B:
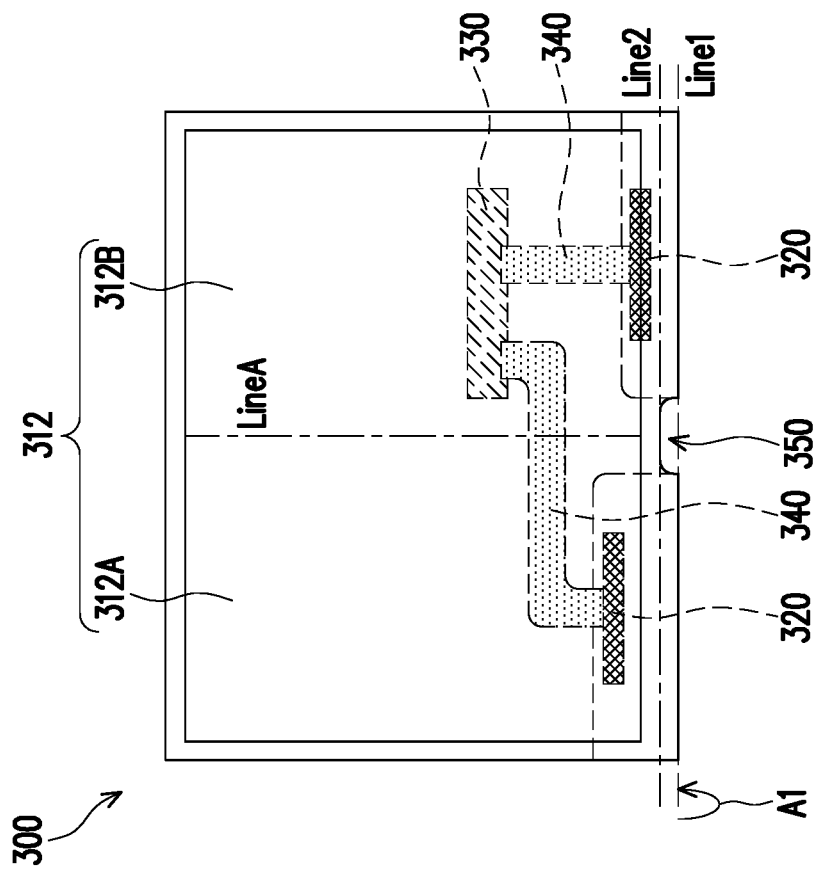
Figure 4C:
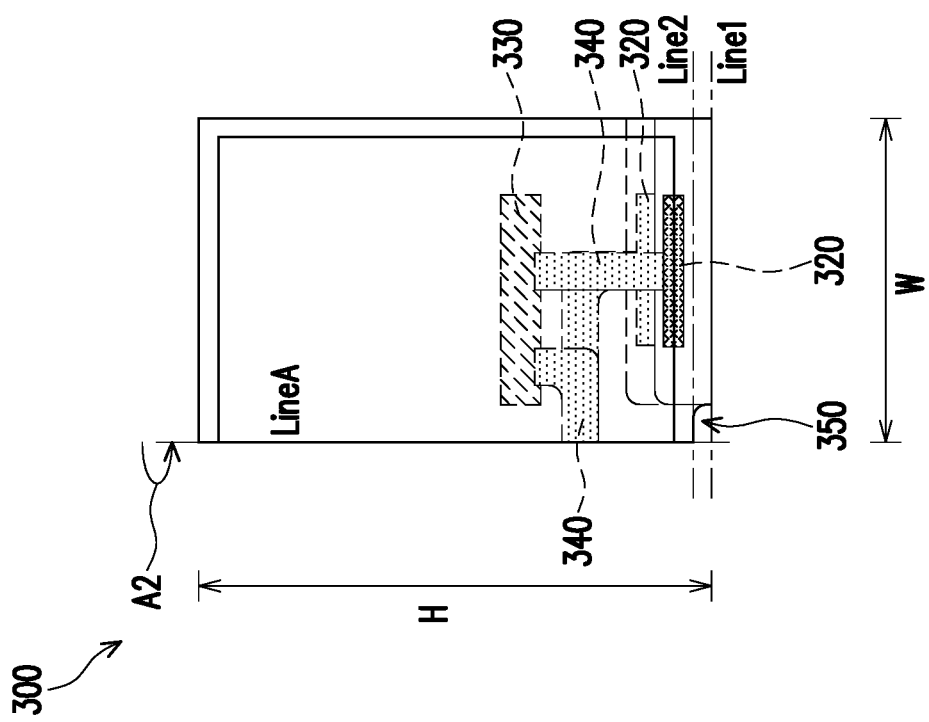

FIG. 4A to FIG. 4C are schematic diagrams of a folding process of the foldable display device according to the first embodiment of the invention. Referring to FIG. 4A and FIG. 4B first, a part of the peripheral region 314, the pad portion 320, the driving element 330, and the connection line 340 are folded to the back of the display panel 310 by using the first peripheral region folding line 1 and the second peripheral region folding line 2 along a direction of an arrow A1. In this way, the peripheral region 314 can be designed to have a narrow border. It may be noted that the first folding interval D1 of the first notch 350 can reduce stress generated by the folding action.

Then referring to FIG. 4B to FIG. 4C, the display panel 310 is folded along a direction of an arrow A2 by using the first display region folding line A, so that a carrying volume of the foldable display device 300 can be reduced. It may be noted that the second folding interval D2 of the first notch 350 can reduce stress generated by the folding action.

Referring to FIG. 4A to FIG. 4C, after the folding action is completed, the pad portion 320 arranged in the peripheral region 314 provided on one side of the first sub-display region 312A and the pad portion 320 arranged in the peripheral region 314 provided on one side of the second sub-display region 312B do not overlap each other, so that the foldable display device 300 can have a smaller thickness.

In addition, referring to FIG. 4A to FIG. 4C, after the folding action is completed, the driving element 330 is located within a range of the first sub-display region 312A (the second sub-display region 312B). Since the driving element 330 does not overlap the first display region folding line A, the folding action of the foldable display device 300 can be smoother.

In addition, the first notch 350 may be further designed to have other shapes, and is not limited to the first notch 350 in the communication hole shape shown in FIG. 3A to FIG. 3B and FIG. 4A to FIG. 4C.

Figure 5A:
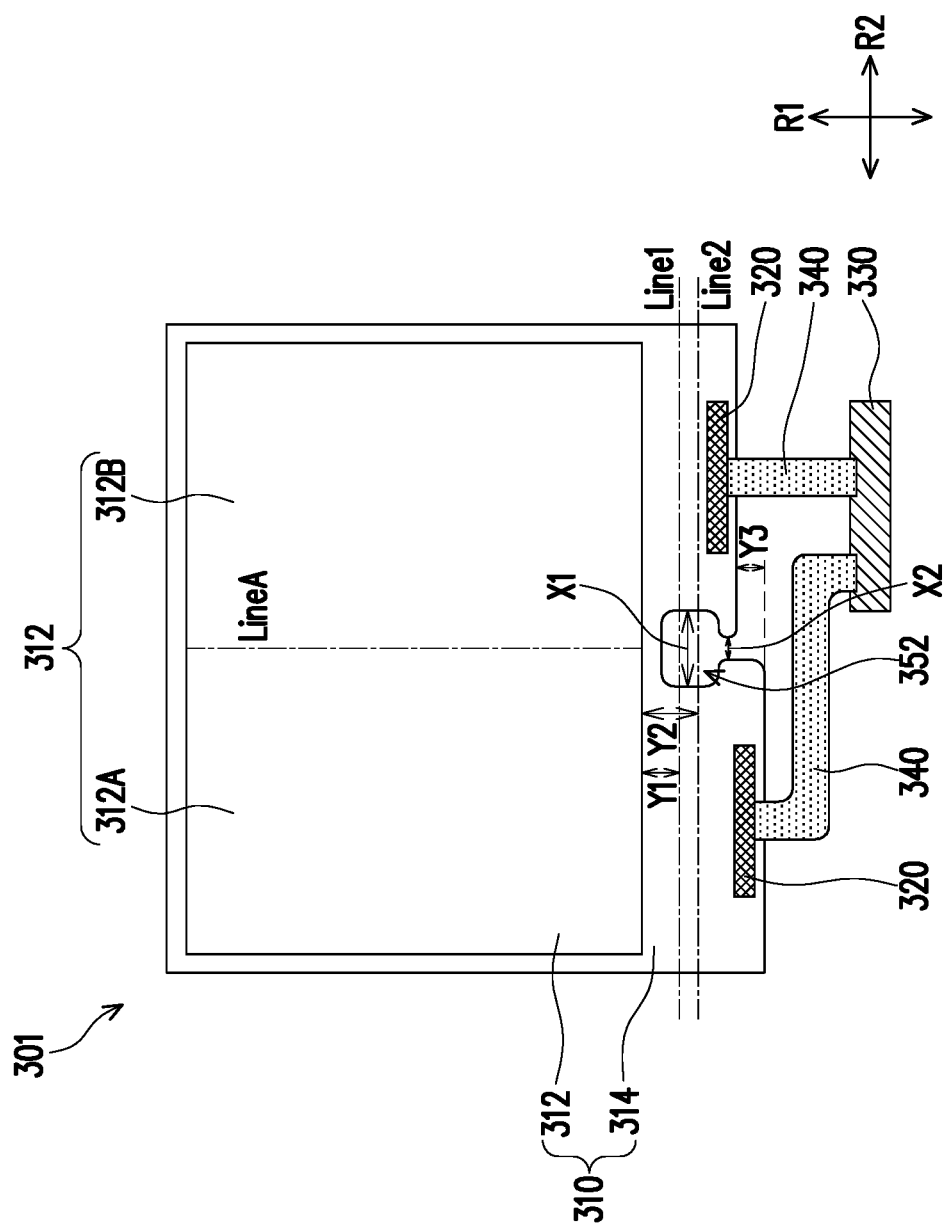
FIG. 5A is a schematic diagram of a foldable display device according to a second embodiment of the invention.

FIG. 5A is a schematic diagram of a foldable display device according to a second embodiment of the invention. In a foldable display device 301 in the second embodiment and the foldable display device 300 in the first embodiment, the same elements are marked with the same element symbols, and the same descriptions are omitted.

Referring to FIG. 5A, in the foldable display device 301 in the second embodiment, in the second direction R2, in the extending direction of the first peripheral region folding line 1 and the second peripheral region folding line 2, a first notch 352 has a first width X1. In the second direction R2, not in the extending direction of the first peripheral region folding line 1 and the second peripheral region folding line 2, the first notch 352 has a second width X2. The second width X2 is less than the first width X1.

As shown in FIG. 5A, in a region in which bidirectional folding is required (that is, a region through which the first peripheral region folding line 1 and the second peripheral region folding line 2 pass), the first notch 352 has the larger first width X1, and in a region in which one-way folding is performed (that is, a region through which the first peripheral region folding line 1 and the second peripheral region folding line 2 skip passing), the first notch 352 has the smaller second width X2. The first notch 352 having the above shape can also increase possibilities of various folding manners of the display panel 310, and can avoid damage to the display panel 310 caused by stress generated during folding.

Figure 5B:
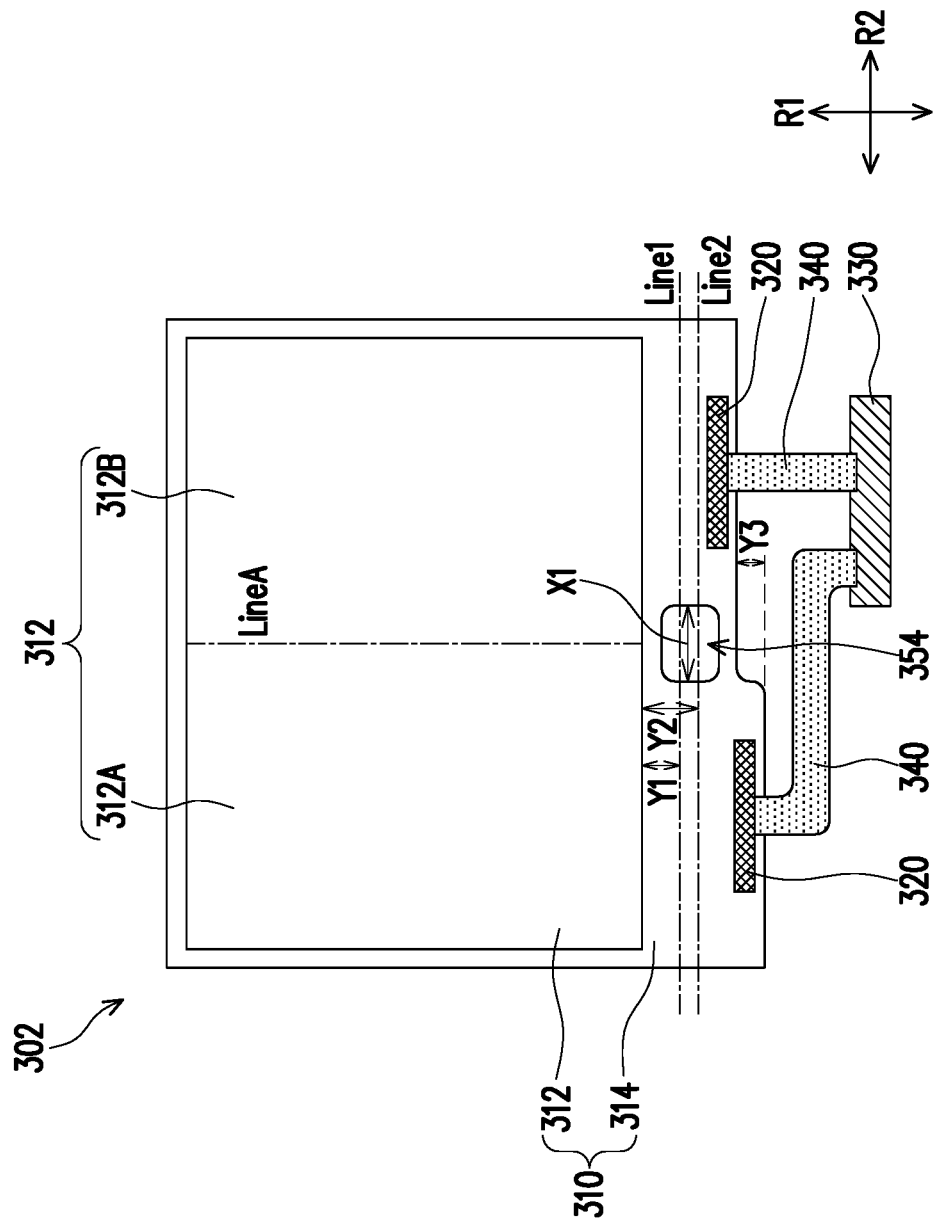
FIG. 5B is a schematic diagram of a foldable display device according to a third embodiment of the invention.

FIG. 5B is a schematic diagram of a foldable display device according to a third embodiment of the invention. In a foldable display device 302 in the third embodiment and the foldable display device 300 in the first embodiment, the same elements are marked with the same element symbols, and the same descriptions are omitted.

Referring to FIG. 5B, in the foldable display device 302 in the third embodiment, a first notch 354 is a closed hole. The first notch 354 is away from the edge of the peripheral region 314, that is, a specific distance exists between the first notch 354 and the peripheral region 314. As shown in FIG. 5B, the closed first notch 354 can be formed merely by digging in the region in which bidirectional folding is required (that is, the region through which the first peripheral region folding line 1 and the second peripheral region folding line 2 pass). In this way, by using the first notch 354, the peripheral region 314 can be folded along the first peripheral region folding line 1 and the second peripheral region folding line 2, and the display region 312 can be folded along the first display region folding line A, so that stress generated by the folding action can be reduced.

The first notch 354 having the above shape can increase possibilities of various folding manners of the display panel 310, and can avoid damage to the display panel 310 caused by stress generated during folding.

Figure 6A:
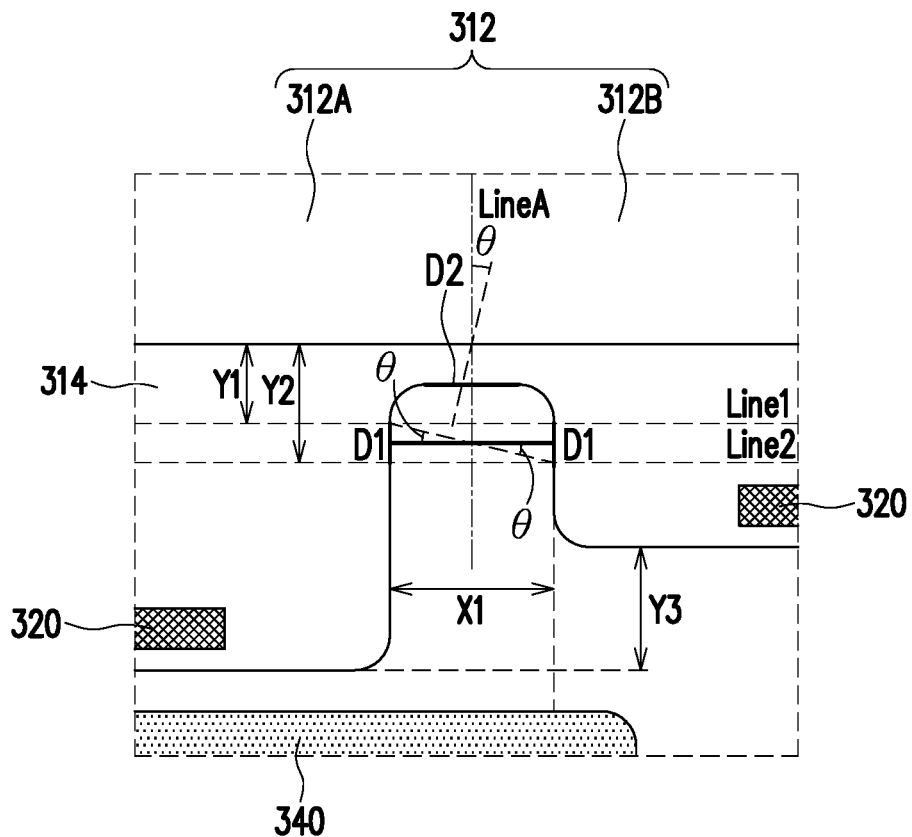
FIG. 6A is an enlarged schematic view of vicinity of the first notch of the foldable display device according to the first embodiment of the invention.
Figure 6B:
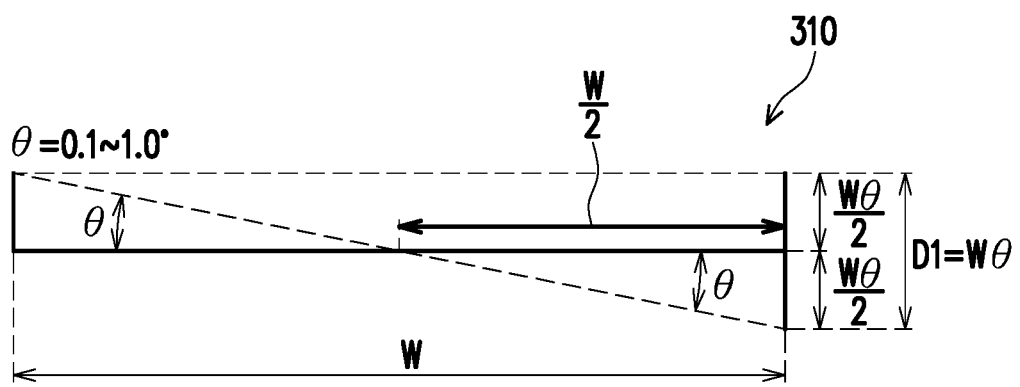
FIG. 6B is a relational graph between a width of a display panel after folding and a length of a first folding interval.
Figure 6C:
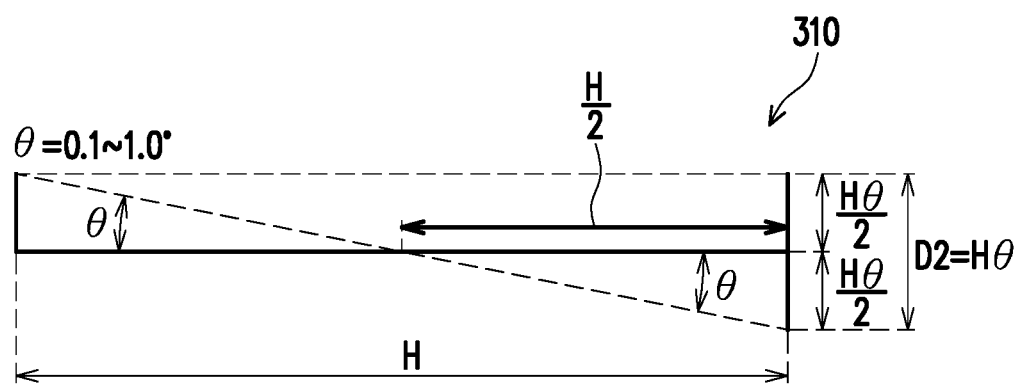
FIG. 6C is a relational graph between a height of a display panel after folding and a length of a second folding interval.

FIG. 6A is an enlarged schematic view of vicinity of the first notch of the foldable display device according to the first embodiment of the invention. FIG. 6B is a relational graph between a width of a display panel after folding and a length of a first folding interval. FIG. 6C is a relational graph between a height of a display panel after folding and a length of a second folding interval.

Referring to FIG. 6A and FIG. 6B, during folding of the peripheral region 314 by using the first folding interval D1, a folding line is located within a range of the first folding interval D1, so that the first folding interval D1 has a folding angle θ. Referring to FIG. 6A, during the folding action, the folding line located within the range of the first folding interval D1 deviates from the folding lines 1 and 2 by a value within an error range, generating an inclination angle. In other words, the "folding angle θ" herein refers to a "variation amount" of the inclination angle of the folding line deviating from the folding lines 1 and 2 during folding.

Referring to FIG. 6A and FIG. 6C, during folding of the display region 312 by using the second folding interval D2, a folding line is located within a range of the second folding interval D2, so that the second folding interval D2 has a folding angle θ. Referring to FIG. 6A, during the folding action, the folding line located within the range of the second folding interval D2 deviates from the folding line A by a value within an error range, generating an inclination angle. In other words, the "folding angle θ" herein refers to a "variation amount" of the inclination angle of the folding line deviating from the folding line A during folding.

Referring to FIG. 4C and FIG. 6A to FIG. 6C, if a width of the display panel 310 after folding is set to W, and a folding angle of the first folding interval D1 is set to θ, a length of the first folding interval D1 satisfies a formula (1):

$$W \times \tan(\theta/\pi) \leq D1 \qquad (1),\text{ where}$$

θ=0.1°.

In addition, referring to FIG. 4C and FIG. 6A to FIG. 6C, if a length of the display panel 310 after folding is set to H, and a folding angle of the second folding interval is set to θ, a length of the second folding interval D2 satisfies a formula (2):

$$H \times \tan(\theta/\pi) \leq D2 \qquad (2),\text{ where}$$

θ=0.1°.

When the width W is much greater than θ, W×tan (θ/π) is approximately W×(θ/π). Likewise, when the height H is much greater than θ, H×tan (θ/π) is approximately H×(θ/π). Descriptions continue by using a case in which both the width W and the height H are much greater than θ below.

Specifically, as shown in FIG. 4C, the width of the display panel 310 after folding is W. In addition, it may be learned from a geometric relationship in FIG. 6B that a length of an opposite side of the folding angle θ is (Wθ/2), and the length of the first folding interval D1 is equal to two opposite side lengths (Wθ/2). Therefore, it may be learned that the length of the first folding interval D1 is 2×(Wθ/2)=Wθ.

Likewise, as shown in FIG. 4C, the height of the display panel 310 after folding is H. In addition, it may be learned from a geometric relationship in FIG. 6C that a length of an opposite side of the folding angle θ is (Hθ/2), and the length of the second folding interval D2 is equal to two opposite side lengths (Hθ/2). Therefore, it may be learned that the length of the second folding interval D2 is 2×(Hθ/2)=Hθ.

Accordingly, the width W and the height H of the display panel 310 after folding may be set, and by using the above folding angle θ that is set, the length WO of the first folding interval D1 and the length HO of the second folding interval D2 can be calculated. In this way, the length Wθ of the first folding interval D1 and the length Hθ of the second folding interval D2 can be easily set, and the foldable display device 300 can be designed more freely. Certainly, the manner of setting the folding angle θ and the width W and the height H of the display panel 310 after folding may also be applied to other embodiments of the invention.

In addition, still referring to FIG. 6A, the length of the first folding interval D1 is less than the height H of the display panel 310 after folding. Moreover, the length of the second folding interval D2 is less than a distance between the two pad portions 320.

Figure 7:
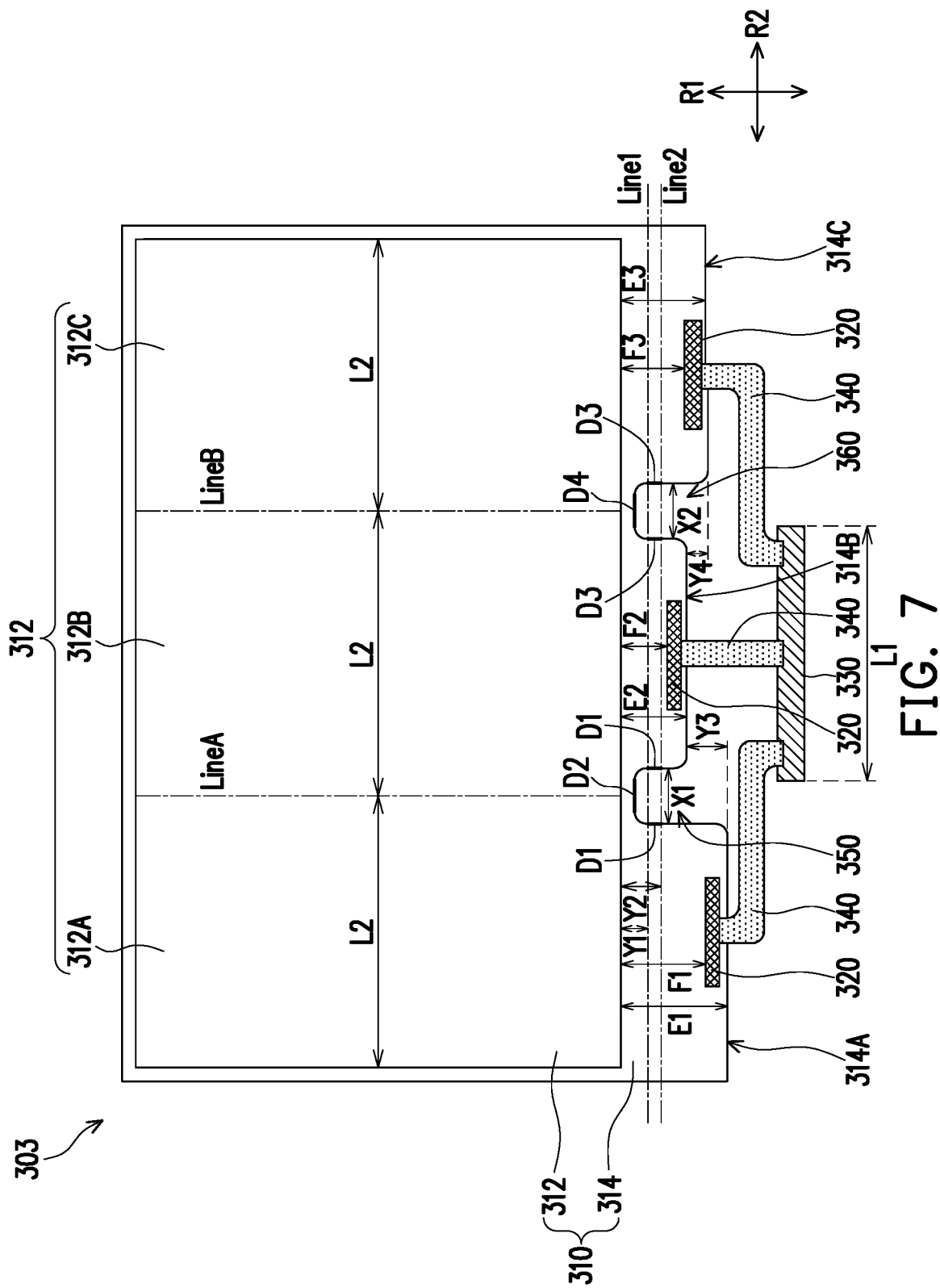
FIG. 7 is a schematic diagram of a foldable display device according to a fourth embodiment of the invention.

FIG. 7 is a schematic diagram of a foldable display device according to a fourth embodiment of the invention. Referring to FIG. 7, a foldable display device 303 includes: a display panel 310, a pad portion 320, and a driving element 330. The display panel 310 has a display region 312 and a peripheral region 314. The peripheral region 314 is connected to at least one side of the display region 312. The pad portion 320 is disposed in the peripheral region 314. The driving element 330 is electrically connected to the pad portion 320. A first display region folding line A and a second display region folding line B are disposed in the display region 312. The first display region folding line A and the second display region folding line B extend along a first direction R1 of the display panel 310 to divide the display region 312 into a first sub-display region 312A, a second sub-display region 312B, and a third sub-display region 312C. A first peripheral region folding line 1 and a second peripheral region folding line 2 are provided in the peripheral region 314 parallel to each other. The first peripheral region folding line 1 and the second peripheral region folding line 2 extend along a second direction R2 that intersects the first direction R1. A first notch 350 is provided at a position in the peripheral region 314 at which an extending direction of the first display region folding line A and an extending direction of the first peripheral region folding line 1 and the second peripheral region folding line 2 intersect. Along the first direction R1, the first notch 350 has a first folding interval D1 between the first peripheral region folding line 1 and the second peripheral region folding line 2. Along the second direction R2, the first notch 350 has a second folding interval D2. A second notch 360 is provided at a position in the peripheral region 314 at which an extending direction of the second display region folding line B and the extending direction of the first peripheral region folding line 1 and the second peripheral region folding line 2 intersect. Along the first direction R1, the second notch 360 has a third folding interval D3 between the first peripheral region folding line 1 and the second peripheral region folding line 2. Along the second direction R2, the second notch 360 has a fourth folding interval D4.

In a foldable display device 303 in the fourth embodiment and the foldable display device 300 in the first embodiment, the same elements are marked with the same element symbols, and the same descriptions are omitted.

Referring to FIG. 7, in the foldable display device 303 in the fourth embodiment, a second display region folding line B is further provided in the display region 310. Therefore, the first display region folding line A and the second display region folding line B divide the display region 312 into a first sub-display region 312A, a second sub-display region 312B, and a third sub-display region 312C.

It may be noted that a second notch 360 is further provided at a position in the peripheral region 314 at which an extending direction of the second display region folding line B and the extending direction of the first peripheral region folding line 1 and the second peripheral region folding line 2 intersect. In addition, along the first direction R1, the second notch 360 has a third folding interval D3 between the first peripheral region folding line 1 and the second peripheral region folding line 2. Along the second direction R2, the second notch 360 has a fourth folding interval D4.

As shown in FIG. 7, likewise, the first folding interval D1, the second folding interval D2, the third folding interval D3, and the fourth folding interval D4 may all be a line segment. The design of the line segment can provide a folding range for performing a folding action, and can better cushion stress generated by the folding action, to avoid damage to the display panel 310.

The peripheral region 314 can be folded along the first peripheral region folding line 1 and the second peripheral region folding line 2 by using the first folding interval D1 (for example, a line segment) of the first notch 350, and the display region 312 can be folded along the first display region folding line A by using the second folding interval D2 (for example, a line segment) of the first notch 350. The peripheral region 314 can be folded along the first peripheral region folding line 1 and the second peripheral region folding line 2 by using the third folding interval D3 (for example, a line segment) of the second notch 360, and the display region 312 can be folded along the second display region folding line B by using the fourth folding interval D4 (for example, a line segment) of the second notch 360. In this way, the stress generated by the folding action can be reduced to avoid damage to the display panel 310. The foldable display device 303 in the fourth embodiment can be applied to a display device with a larger area.

Referring to FIG. 7, a distance F1 between the pad portion 320 arranged in the peripheral region 314 provided on one side of the first sub-display region 312A and the display region 312, a distance F2 between the pad portion 320 arranged in the peripheral region 314 provided on one side of the second sub-display region 312B and the display region 312, and a distance F3 between the pad portion 320 arranged in the peripheral region 314 provided on one side of the third sub-display region 312C and the display region 312 are different from each other. In such an arrangement, the three pad portions 320 can be at different positions in the peripheral region 314 in the first direction R1. Therefore, in the foldable display device 303 after folding, the three pad portions 320 do not overlap each other, so that the foldable display device 303 after folding can have a smaller thickness.

Still referring to FIG. 7, in the second direction R2, a length L1 of the driving element 330 is less than a length L2 of the first sub-display region 312A. In the second direction R2, the length L1 of the driving element 330 is less than a length L2 of the second sub-display region 312B. In the second direction R2, the length L1 of the driving element 330 is less than a length L2 of the third sub-display region 312C. Therefore, during folding of the display region 312 along the first display region folding line A and the second display region folding line B, the driving element 330 does not overlap the first display region folding line A and the second display region folding line B, so that folding of the foldable display device 300 can be smoother.

Referring to FIG. 7, in the second direction R2, the first notch 350 has a first width X1 greater than the second folding interval D2. In the second direction R2, the second notch 360 has a second width X2 greater than the fourth folding interval D4. In this way, during folding of the display region 312 along the first display region folding line A, the second folding interval D2 can reduce stress generated by the folding action, and the folding action can be controlled within a range of the first width X1 of the first notch 350. During folding of the display region 312 along the second display region folding line B, the fourth folding interval D4 can reduce stress generated by the folding action, and the folding action can be controlled within a range of the second width X2 of the second notch 360.

Referring to FIG. 7, a first distance Y1 exists between the first peripheral region folding line 1 and the display region 312. A second distance Y2 exists between the second peripheral region folding line 2 and the display region 312.

The peripheral region 314 provided on one side of the first sub-display region 312A has a first edge 314A, the peripheral region 314 provided on one side of the second sub-display region 312B has a second edge 314B, and the peripheral region 314 provided on one side of the third sub-display region 312C has a third edge 314C. A third distance Y3 between the first edge 314A and the second edge 314B, and a second distance Y4 exists between the second edge 314B and the third edge 314C. In such an arrangement, the three pad portions 320 can be at different positions in the peripheral region 314 in the first direction R1.

Referring to FIG. 7, the peripheral region 314 provided on one side of the first sub-display region 312A has a first edge 314A, the peripheral region 314 provided on one side of the second sub-display region 312B has a second edge 314B, and the peripheral region 314 provided on one side of the third sub-display region 312C has a third edge 314C. A distance E1 between the first edge 314A and the display region 312, a distance E2 between the second edge 314B and the display region 312, and a distance E3 between the third edge 314C and the display region 312 are different from each other. In such an arrangement, the three pad portions 320 can be at different positions in the peripheral region 314 in the first direction R1. Further, in the foldable display device 303 after folding, the three pad portions 320 do not overlap each other, so that the foldable display device 303 after folding can have a smaller thickness.

Referring to FIG. 7, the first notch 350 and the second notch 360 are communication holes, and the first notch 350 and the second notch 360 each are communicated from an edge of the peripheral region 314 toward an inner side of the peripheral region 314. In addition, the first notch 350 and the second notch 360 may be further designed to have other shapes, and are not limited to the first notch 350 and the second notch 360 in the communication hole shape shown in FIG. 7.

Figure 8:
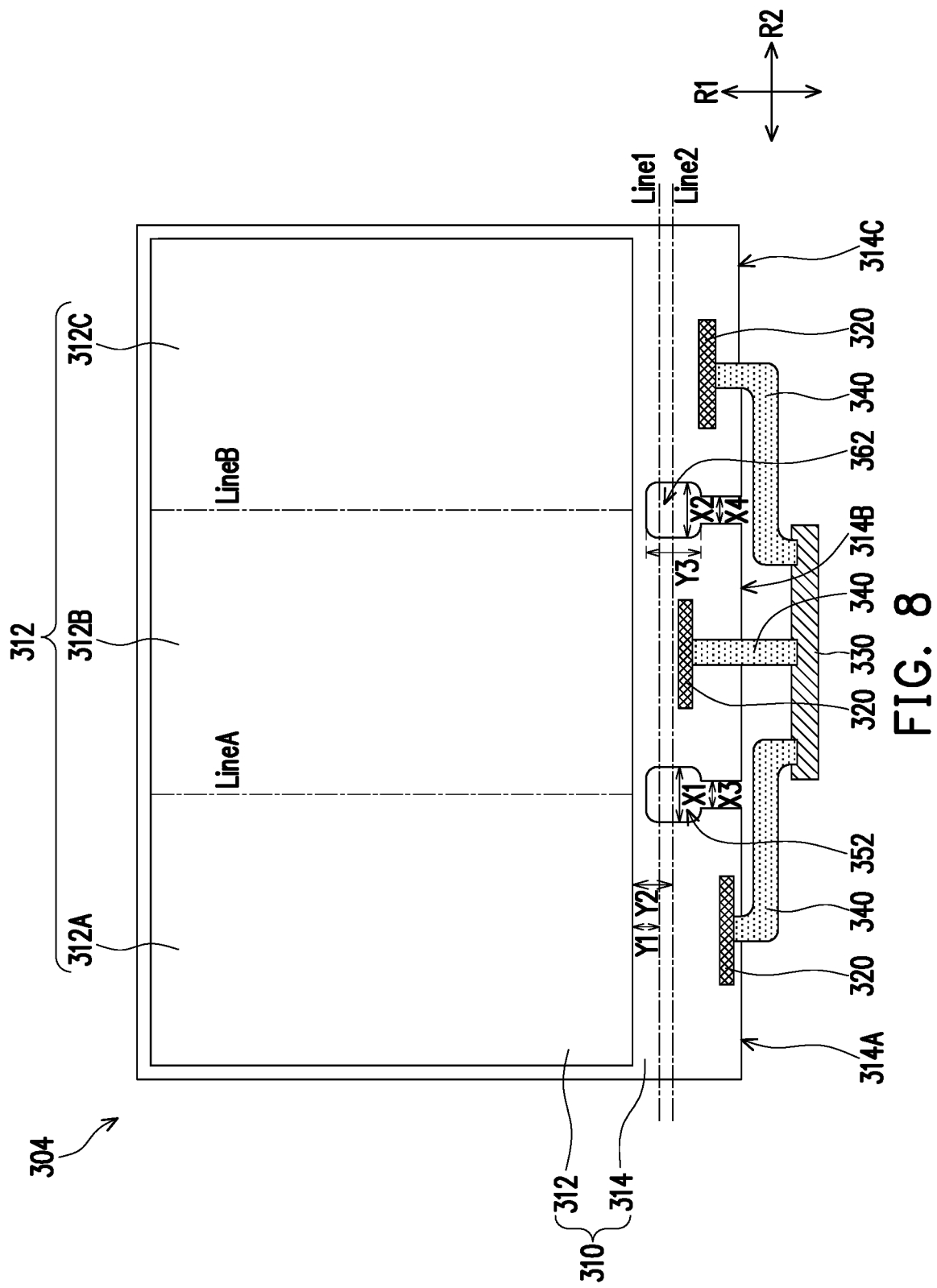
FIG. 8 is a schematic diagram of a foldable display device according to a fifth embodiment of the invention.

FIG. 8 is a schematic diagram of a foldable display device according to a fifth embodiment of the invention. In a foldable display device 304 in the fifth embodiment and the foldable display device 303 in the fourth embodiment, the same elements are marked with the same element symbols, and the same descriptions are omitted.

Referring to FIG. 8, in the foldable display device 304 in the fifth embodiment, in the second direction R2, in the extending direction of the first peripheral region folding line 1 and the second peripheral region folding line 2, the first notch 352 has a first width X1, and the second notch 362 has a second width X2. In the second direction R2, not in the extending direction of the first peripheral region folding line 1 and the second peripheral region folding line 2, the first notch 352 has a third width X3, and the second notch 362 has a fourth width X4. The third width X3 is less than the first width X1, and the fourth width X4 is less than the second width X2.

As shown in FIG. 8, in a region in which bidirectional folding is required (that is, a region through which the first peripheral region folding line 1 and the second peripheral region folding line 2 pass), the first notch 352 has the larger first width X1, and the second notch 362 has the larger second width X2, and in a region in which one-way folding is performed (that is, a region through which the first peripheral region folding line 1 and the second peripheral region folding line 2 skip passing), the first notch 352 has the smaller third width X3, and the second notch 362 has the smaller fourth width X4. The first notch 352 and the second notch 362 having the above shape can also increase possibilities of various folding manners of the display panel 310, and can avoid damage to the display panel 310 caused by stress generated during folding.

Figure 9:
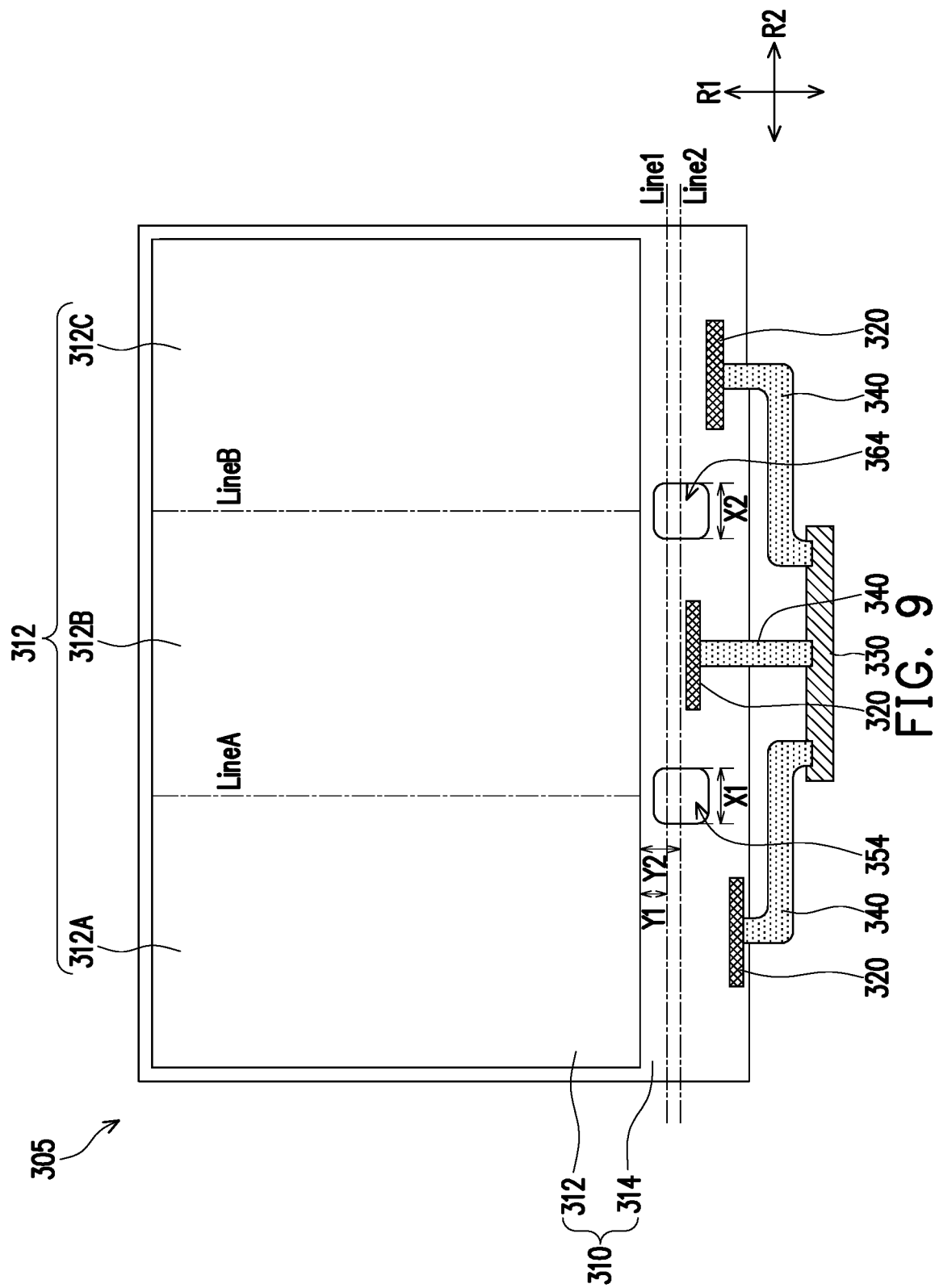
FIG. 9 is a schematic diagram of a foldable display device according to a sixth embodiment of the invention.

FIG. 9 is a schematic diagram of a foldable display device according to a sixth embodiment of the invention. In a foldable display device 305 in the sixth embodiment and the foldable display device 303 in the fourth embodiment, the same elements are marked with the same element symbols, and the same descriptions are omitted.

Referring to FIG. 9, in the foldable display device 305 in the sixth embodiment, a first notch 354 and a second notch 364 are closed holes. The first notch 354 and the second notch 364 are away from the edge of the peripheral region 314, that is, a specific distance exists between the first notch 354 and the peripheral region 314 and between the second notch 364 and the peripheral region 314.

As shown in FIG. 9, the closed first notch 354 and second notch 364 can be formed merely by digging in the region in which bidirectional folding is required (that is, the region through which the first peripheral region folding line 1 and the second peripheral region folding line 2 pass). In this way, by using the first notch 354 and the second notch 364, the peripheral region 314 can be folded along the first peripheral region folding line 1 and the second peripheral region folding line 2, and the display region 312 can be folded along the first display region folding line A, so that stress generated by the folding action can be reduced.

The first notch 354 and the second notch 364 having the above shape can also increase possibilities of various folding manners of the display panel 310, and can avoid damage to the display panel 310 caused by stress generated during folding.

Figure 10:
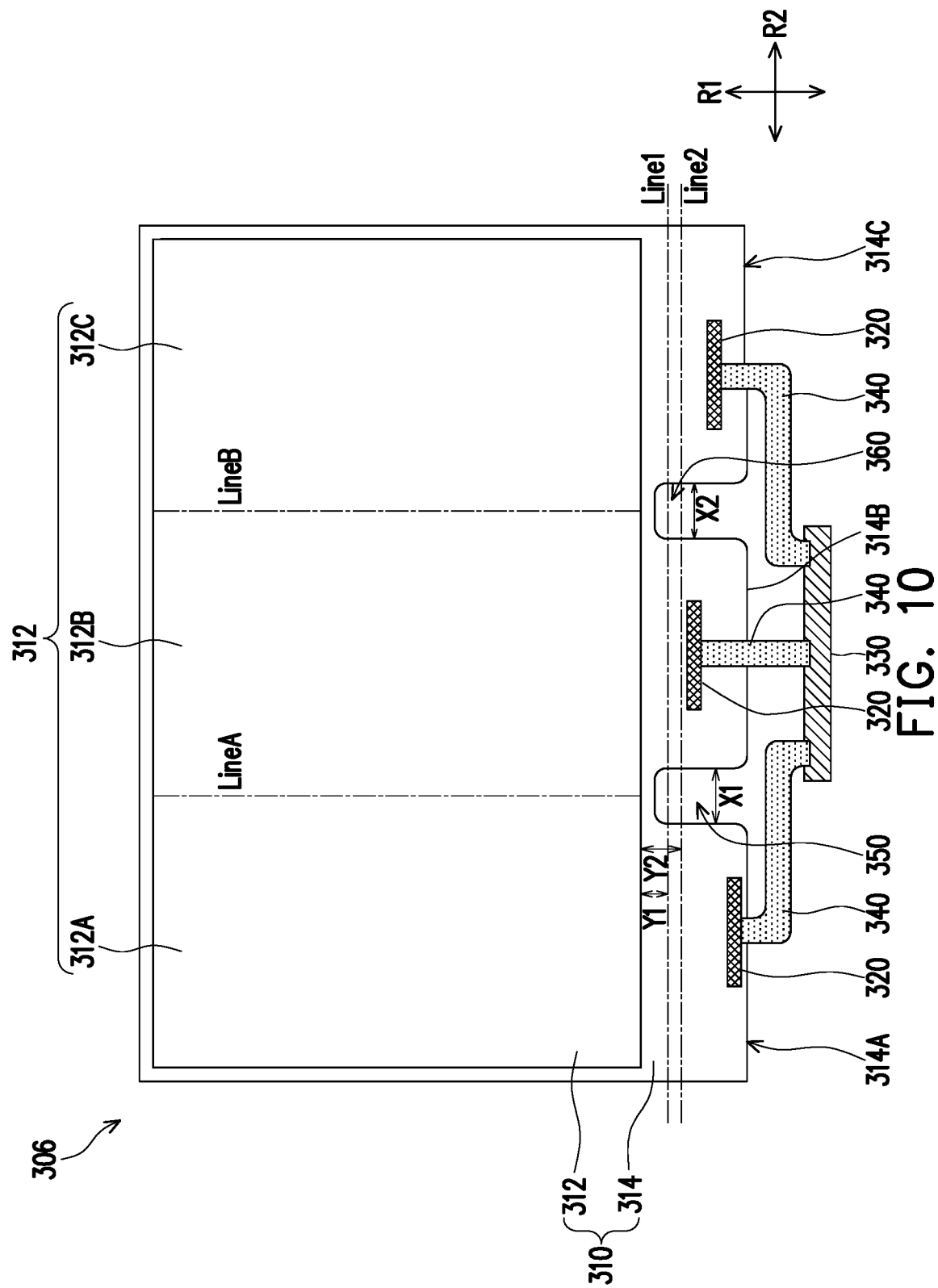
FIG. 10 is a schematic diagram of a foldable display device according to a seventh embodiment of the invention.

FIG. 10 is a schematic diagram of a foldable display device according to a seventh embodiment of the invention. In a foldable display device 306 in the seventh embodiment and the foldable display device 303 in the fourth embodiment, the same elements are marked with the same element symbols, and the same descriptions are omitted.

Referring to FIG. 10, in the foldable display device 306 in the seventh embodiment, the peripheral region 314 provided on one side of the first sub-display region 312A has a first edge 314A, the peripheral region 314 provided on one side of the second sub-display region 312B has a second edge 314B, and the peripheral region 314 provided on one side of the third sub-display region 312C has a third edge 314C. The first edge 314A, the second edge 314B, and the third edge 314C are aligned with each other. The pad portion 320 arranged in the peripheral region 314 provided on one side of the first sub-display region 312A, the pad portion 320 arranged in the peripheral region 314 provided on one side of the second sub-display region 312B, and the pad portion 320 arranged in the peripheral region 314 provided on one side of the third sub-display region 312C are not aligned with each other.

In such an arrangement, the three pad portions 320, 320, and 320 can be at different positions in the peripheral region 314 in the first direction R1. Therefore, in the foldable display device 306 after folding, the three pad portions 320, 320, and 320 do not overlap each other, so that the foldable display device 306 after folding can have a smaller thickness.

Figure 11B:
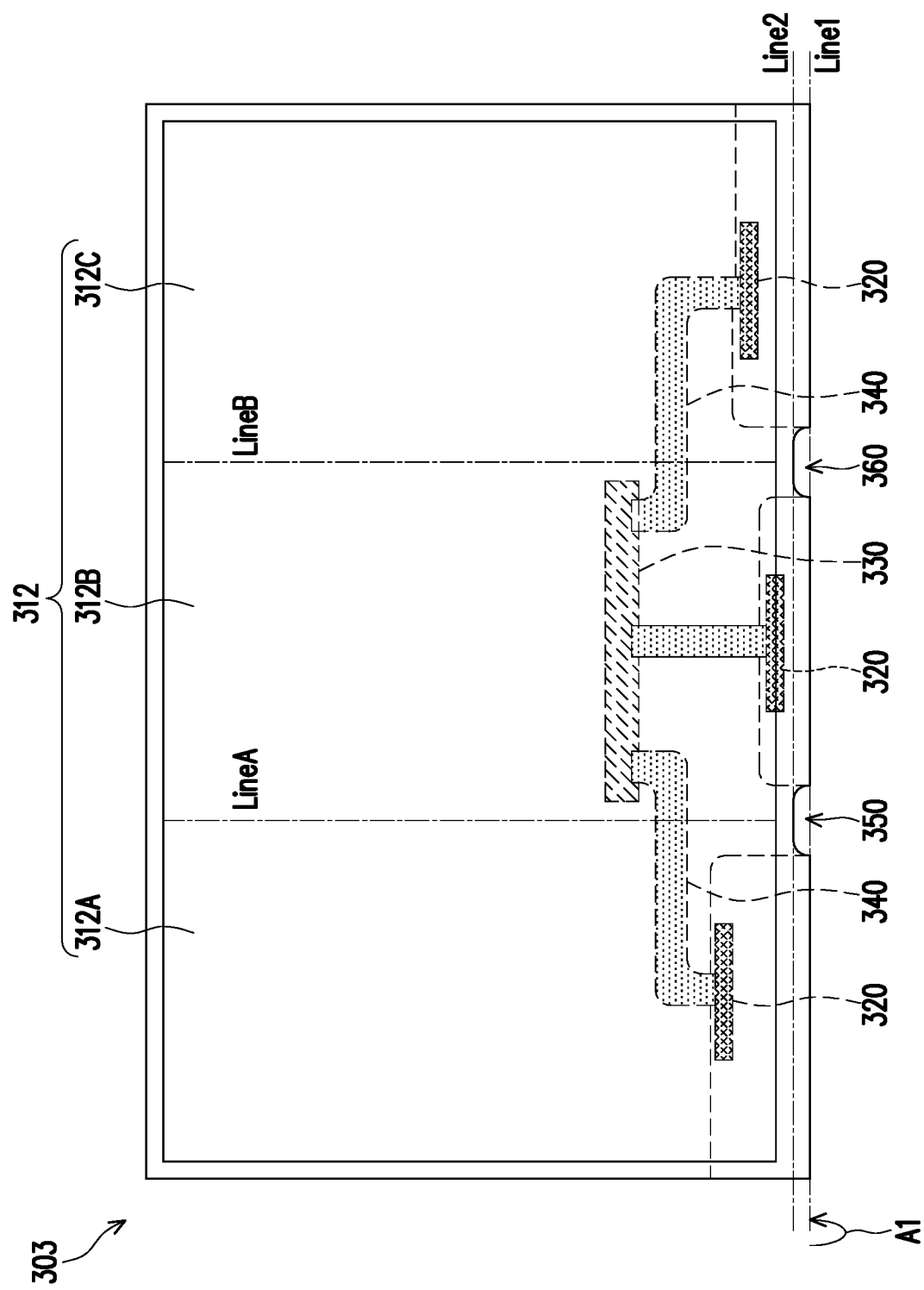
Figure 11C:
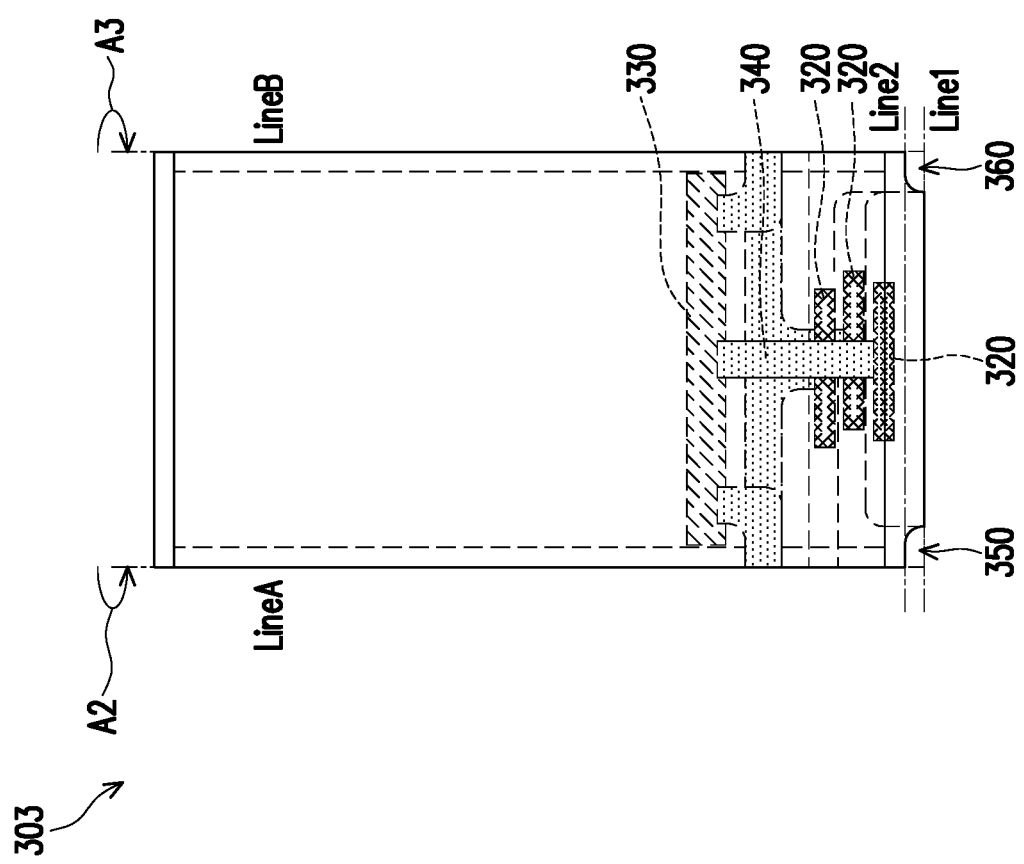

FIG. 11A to FIG. 11C are schematic diagrams of folding the foldable display device according to the fourth embodiment of the invention. Referring to FIG. 11A and FIG. 11B first, a part of the peripheral region 314, the pad portion 320, the driving element 330, and the connection line 340 are folded to the back of the display panel 310 by using the first peripheral region folding line 1 and the second peripheral region folding line 2 along a direction of an arrow A1. In this way, the peripheral region 314 can be designed to have a narrow border. It may be noted that the first folding interval D1 of the first notch 350 and the third folding interval D3 of the second notch 360 can reduce stress generated by the folding action.

Then referring to FIG. 11B to FIG. 11C, the display panel 310 is folded outward along a direction of an arrow A2 by using the first display region folding line A, and is folded outward along a direction of an arrow A3 by using the second display region folding line B, so that a carrying volume of the foldable display device 303 can be reduced. It may be noted that the second folding interval D2 of the first notch 350 and the fourth folding interval D4 of the second notch 360 can reduce stress generated by the folding action.

Referring to FIG. 11A to FIG. 11C, after the folding action is completed, the pad portion 320 arranged in the peripheral region 314 provided on one side of the first sub-display region 312A, the pad portion 320 arranged in the peripheral region 314 provided on one side of the second sub-display region 312B, and the pad portion 320 arranged in the peripheral region 314 provided on one side of the third sub-display region 312C do not overlap each other, so that the foldable display device 303 can have a smaller thickness.

In addition, referring to FIG. 11A to FIG. 11C, after the folding action is completed, the driving element 330 is located within a range of the first sub-display region 312A (the second sub-display region 312B or the third sub-display region 312C). Since the driving element 330 does not overlap the first display region folding line A and the second display region folding line B, the folding action of the foldable display device 303 can be smoother. The folding action of the foldable display device 303 shown in FIG. 11A to FIG. 11C can be applied to products such as tablet computers and tablet phones.

Figure 12A:
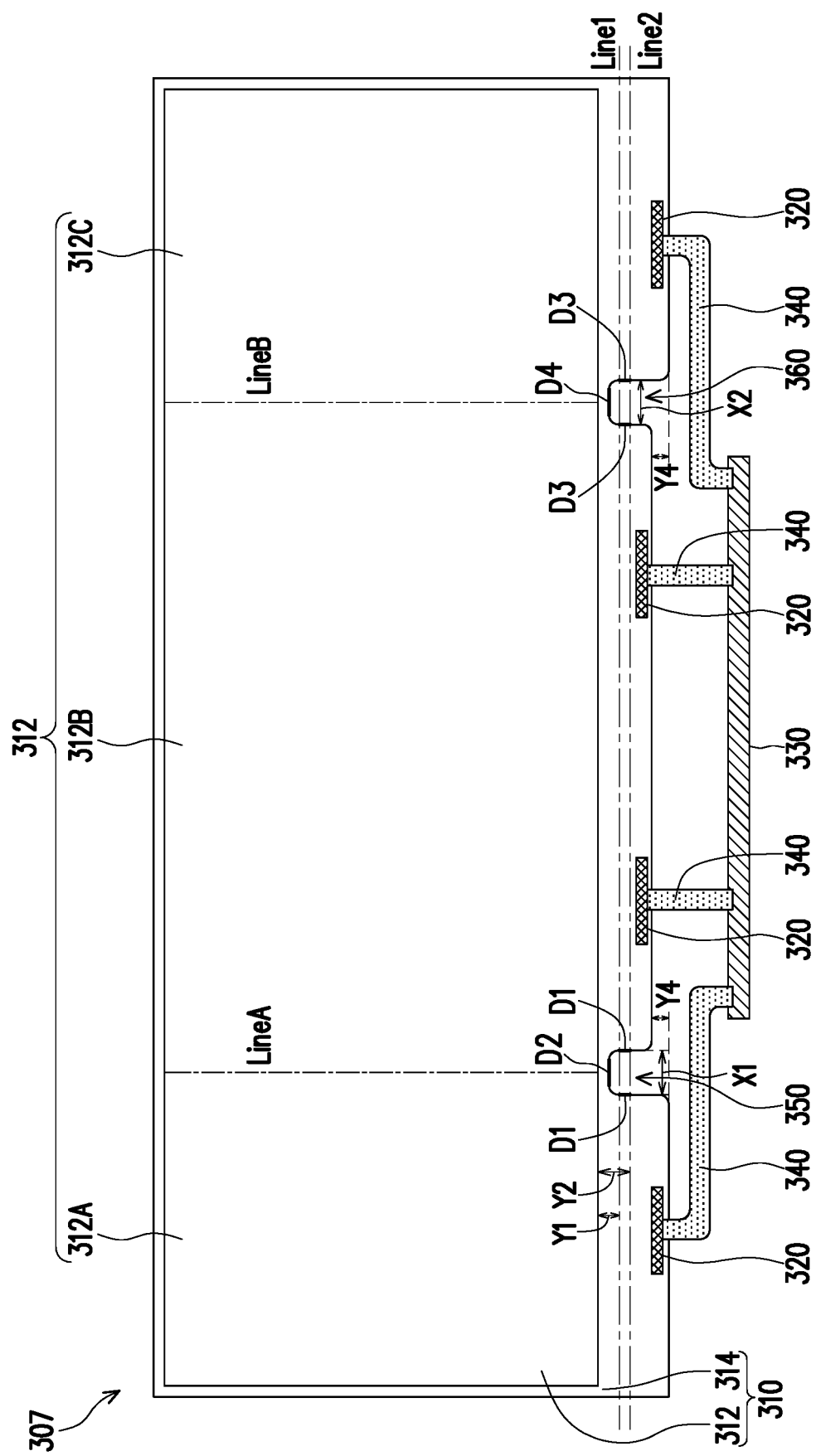
FIG. 12A to FIG. 12C are schematic diagrams of a folding process of the foldable display device according to the eighth embodiment of the invention.
Figure 12B:
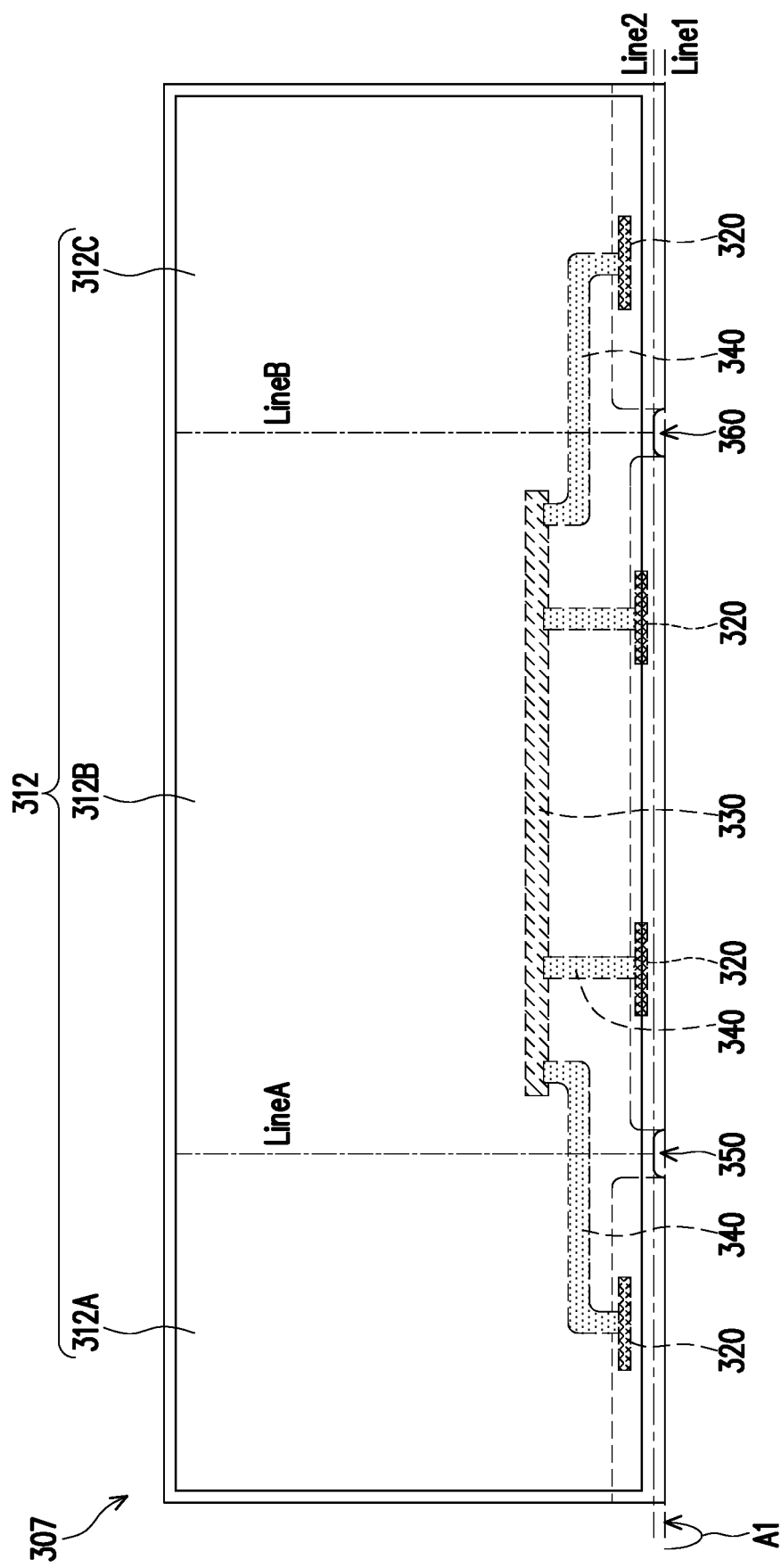
Figure 12C:
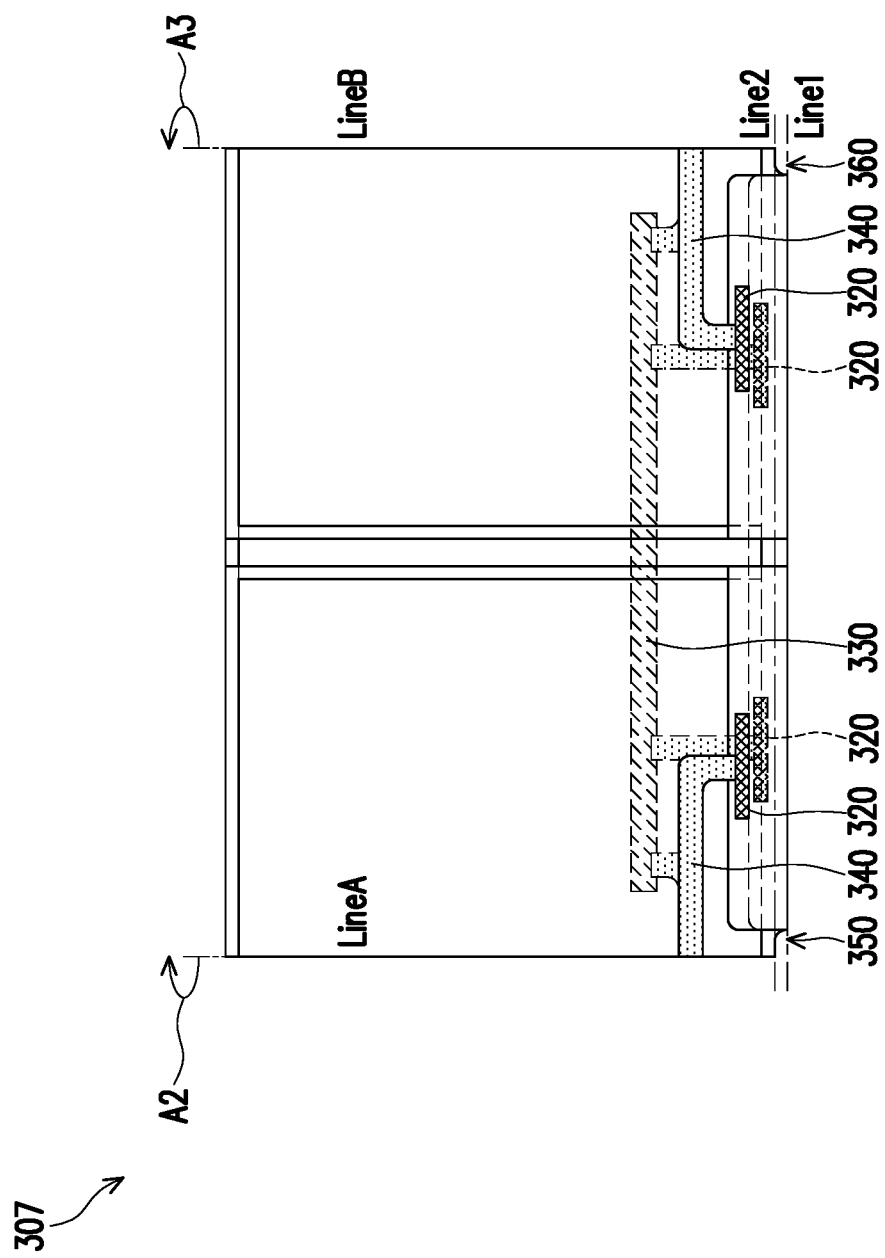

FIG. 12A to FIG. 12C are schematic diagrams of a folding process of the foldable display device according to the eighth embodiment of the invention. In a foldable display device 307 in the eighth embodiment and the foldable display device 303 in the fourth embodiment, the same elements are marked with the same element symbols, and the same descriptions are omitted.

The foldable display device 307 in the eighth embodiment can be applied to a notebook computer. Referring to FIG. 12A, an area of the second sub-display region 312B located in the center is greater than areas of the first sub-display region 312A and third sub-display region 312C located on two sides. Therefore, two pad portions 320 and two connection lines 340 may be disposed in the peripheral region on one side of the second sub-display region 312B, so that the driving element 330 can drive the second sub-display region 312B with a larger area well.

A folding process of the foldable display device 307 according to the eighth embodiment is described below. Referring to FIG. 12A and FIG. 12B first, a part of the peripheral region 314, the pad portion 320, the driving element 330, and the connection line 340 are folded to the back of the display panel 310 by using the first peripheral region folding line 1 and the second peripheral region folding line 2 along a direction of an arrow A1. In this way, the peripheral region 314 can be designed to have a narrow border. It may be noted that the first folding interval D1 of the first notch 350 and the third folding interval D3 of the second notch 360 can reduce stress generated by the folding action.

Then referring to FIG. 12B to FIG. 12C, the display panel 310 is folded inward along a direction of an arrow A2 by using the first display region folding line A, and is folded inward along a direction of an arrow A3 by using the second display region folding line B, so that a carrying volume of the foldable display device 307 can be reduced. It may be noted that the second folding interval D2 of the first notch 350 and the fourth folding interval D4 of the second notch 360 can reduce stress generated by the folding action.

Referring to FIG. 12A to FIG. 12C, after the folding action is completed, the pad portion 320 arranged in the peripheral region 314 provided on one side of the first sub-display region 312A, the two pad portions 320 arranged in the peripheral region 314 provided on one side of the second sub-display region 312B, and the pad portion 320 arranged in the peripheral region 314 provided on one side of the third sub-display region 312C do not overlap each other, so that the foldable display device 307 can have a smaller thickness.

In addition, referring to FIG. 12A to FIG. 12C, after the folding action is completed, the driving element 330 is located within a range of the second sub-display region 312B. Since the driving element 330 does not overlap the first display region folding line A and the second display region folding line B, the folding action of the foldable display device 307 can be smoother.

Based on the above, during folding of the display region and the peripheral region of the foldable display device of the invention, folding actions in two directions can be performed by using the first notch (or the second notch), and stress generated by the folding action can be reduced. Therefore, in the invention, possibilities of various folding manners of a display panel can be increased, and damage to the display panel caused by stress generated during folding can be avoided.

In the above embodiments, only embodiments of one notch (the first notch 350) and two notches (the first notch 350 and the second notch 360) are mentioned. However, in other embodiments, more than two of the above notches may be disposed. In the invention, a number of notches is not limited, and may be appropriately designed and adjusted according to an area of the display panel.

Although the invention is described with reference to the above embodiments, the embodiments are not intended to limit the invention. A person of ordinary skill in the art may make variations and modifications without departing from the spirit and scope of the invention. Therefore, the protection scope of the invention should be subject to the appended claims.

What is claimed is:

1. A foldable display device, comprising:
    a display panel having a display region and a peripheral region, and the peripheral region being connected to at least one side of the display region;
    a pad portion disposed in the peripheral region; and
    a driving element electrically connected to the pad portion,
    wherein
    a first display region folding line is disposed in the display region, and the first display region folding extends along a first direction of the display panel to divide the display region into a first sub-display region and a second sub-display region, wherein the peripheral region disposed on one side of the first sub-display region has a first edge, the peripheral region disposed on one side of the second sub-display region has a second edge, and a distance between the first edge and the display region is different from a distance between the second edge and the display region,
    a first peripheral region folding line and a second peripheral region folding line are disposed parallel to each other in the peripheral region, and the first peripheral region folding line and the second peripheral region folding line extend along a second direction intersecting the first direction,
    a first notch is disposed at a position of the peripheral region where an extending direction of the first display region folding line and an extending direction of the first peripheral region folding line and the second peripheral region folding line intersect,
    along the first direction, the first notch has a first folding interval between the first peripheral region folding line and the second peripheral region folding line; and
    along the second direction, the first notch has a second folding interval.

2. The foldable display device according to claim 1, wherein
    a distance between the pad portion arranged in the peripheral region disposed on one side of the first sub-display region and the display region is different from a distance between the pad portion arranged in the peripheral region disposed on one side of the second sub-display region and the display region.

3. The foldable display device according to claim 1, wherein
    in the second direction, the first notch has a first width greater than the second folding interval.

4. The foldable display device according to claim 1, wherein
a first distance exists between the first peripheral region folding line and the display region, and
a second distance exists between the second peripheral region folding line and the display region.

5. The foldable display device according to claim 1, wherein
a third distance exists between the first edge and the second edge.

6. The foldable display device according to claim 1, wherein
in the second direction, the first notch has a first width in the extending direction of the first peripheral region folding line and the second peripheral region folding line; and
in the second direction, the first notch has a second width not in the extending direction of the first peripheral region folding line and the second peripheral region folding line;
wherein the second width is less than the first width.

7. The foldable display device according to claim 1, wherein
the first notch is a closed hole, and a distance exists between the first notch and an edge of the peripheral region.

8. The foldable display device according to claim 1, wherein
a width of the display panel after folding is set to W; and
a folding angle of the first folding interval is set to θ, a length D1 of the first folding interval satisfies Formula (1):

$$W \times \tan(\theta/\pi) \leq D1 \quad (1),$$ where
θ=0.1°.

9. The foldable display device according to claim 1, wherein
a height of the display panel after folding is set to H, and
a folding angle of the second folding interval is set to θ, a length D2 of the second folding interval satisfies Formula (2):

$$H \times \tan(\theta/\pi) \leq D2 \quad (2),$$ where
θ=0.1°.

10. A foldable display device, comprising:
a display panel having a display region and a peripheral region, and the peripheral region being connected to at least one side of the display region;
a pad portion disposed in the peripheral region; and
a driving element electrically connected to the pad portion,
wherein
a first display region folding line and a second display region folding line are disposed in the display region, and the first display region folding line and the second display region folding line extend along a first direction of the display panel to divide the display region into a first sub-display region, a second sub-display region, and a third sub-display region, wherein a distance between the pad portion arranged in the peripheral region disposed on one side of the first sub-display region and the display region, a distance between the pad portion arranged in the peripheral region disposed on one side of the second sub-display region and the display region, and a distance between the pad portion arranged in the peripheral region disposed on one side of the third sub-display region and the display region are different from one another,
a first peripheral region folding line and a second peripheral region folding line are disposed parallel to each other in the peripheral region, and the first peripheral region folding line and the second peripheral region folding line extend along a second direction intersecting the first direction,
a first notch is disposed at a position of the peripheral region where an extending direction of the first display region folding line and an extending direction of the first peripheral region folding line and the second peripheral region folding line intersect,
along the first direction, the first notch has a first folding interval between the first peripheral region folding line and the second peripheral region folding line,
along the second direction, the first notch has a second folding interval;
a second notch is disposed at a position of the peripheral region where an extending direction of the second display region folding line and the extending direction of the first peripheral region folding line and the second peripheral region folding line intersect,
along the first direction, the second notch has a third folding interval between the first peripheral region folding line and the second peripheral region folding line; and
along the second direction, the second notch has a fourth folding interval.

11. The foldable display device according to claim 10, wherein
in the second direction, a length of the driving element is less than a length of the first sub-display region;
in the second direction, the length of the driving element is less than a length of the second sub-display region; and
in the second direction, the length of the driving element is less than a length of the third sub-display region.

12. The foldable display device according to claim 10, wherein
in the second direction, the first notch has a first width greater than the second folding interval; and
in the second direction, the second notch has a second width greater than the fourth folding interval.

13. The foldable display device according to claim 10, wherein
a first distance exists between the first peripheral region folding line and the display region, and
a second distance exists between the second peripheral region folding line and the display region.

14. The foldable display device according to claim 13, wherein
the peripheral region disposed on one side of the first sub-display region has a first edge,
the peripheral region disposed on one side of the second sub-display region has a second edge,
the peripheral region disposed on one side of the third sub-display region has a third edge,
a third distance exists between the first edge and the second edge, and
a fourth distance exists between the second edge and the third edge.

15. The foldable display device according to claim 10, wherein
the peripheral region disposed on one side of the first sub-display region has a first edge, and the peripheral region disposed on one side of the second sub-display region has a second edge, and the peripheral region disposed on one side of the third sub-display region has a third edge, and a distance between the first edge and the display region, a distance between the second edge and the display region, and a distance between the third edge and the display region are different from one another.

16. The foldable display device according to claim 10, wherein the first notch and the second notch are communication holes, the first notch is communicated from an edge of the peripheral region toward an inner side of the peripheral region, and the second notch is communicated from the edge of the peripheral region toward the inner side of the peripheral region.

17. The foldable display device according to claim 10, wherein in the second direction, the first notch has a first width and the second notch has a second width in the extending direction of the first peripheral region folding line and the second peripheral region folding line;

in the second direction, the first notch has a third width and the second notch has a fourth width not in the extending direction of the first peripheral region folding line and the second peripheral region folding line;

wherein the third width is less than the first width, and the fourth width is less than the second width.

18. The foldable display device according to claim 10, wherein the first notch and the second notch are closed holes, a distance exists between the first notch and an edge of the peripheral region, and a distance exists between the second notch and the edge of the peripheral region.

19. The foldable display device according to claim 10, wherein the peripheral region disposed on one side of the first sub-display region has a first edge, the peripheral region disposed on one side of the second sub-display region has a second edge, the peripheral region disposed on one side of the third sub-display region has a third edge, the first edge, the second edge, and the third edge are aligned with one another, and the pad portion arranged in the peripheral region disposed on one side of the first sub-display region, the pad portion arranged in the peripheral region disposed on one side of the second sub-display region, and the pad portion arranged in the peripheral region disposed on one side of the third sub-display region are not aligned with one another.

20. A foldable display device, comprising:

a display panel having a display region and a peripheral region, and the peripheral region being connected to at least one side of the display region;

a pad portion disposed in the peripheral region; and a driving element electrically connected to the pad portion, wherein a first display region folding line and a second display region folding line are disposed in the display region, and the first display region folding line and the second display region folding line extend along a first direction of the display panel to divide the display region into a first sub-display region, a second sub-display region, and a third sub-display region, wherein the peripheral region disposed on one side of the first sub-display region has a first edge, and the peripheral region disposed on one side of the second sub-display region has a second edge, and the peripheral region disposed on one side of the third sub-display region has a third edge, and a distance between the first edge and the display region, a distance between the second edge and the display region, and a distance between the third edge and the display region are different from one another, a first peripheral region folding line and a second peripheral region folding line are disposed parallel to each other in the peripheral region, and the first peripheral region folding line and the second peripheral region folding line extend along a second direction intersecting the first direction, a first notch is disposed at a position of the peripheral region where an extending direction of the first display region folding line and an extending direction of the first peripheral region folding line and the second peripheral region folding line intersect, along the first direction, the first notch has a first folding interval between the first peripheral region folding line and the second peripheral region folding line, along the second direction, the first notch has a second folding interval;

a second notch is disposed at a position of the peripheral region where an extending direction of the second display region folding line and the extending direction of the first peripheral region folding line and the second peripheral region folding line intersect, along the first direction, the second notch has a third folding interval between the first peripheral region folding line and the second peripheral region folding line; and along the second direction, the second notch has a fourth folding interval.

* * * * *